(12) United States Patent
Liang et al.

(10) Patent No.: US 12,531,745 B2
(45) Date of Patent: Jan. 20, 2026

(54) CONTENT TRANSMISSION PROTECTION METHOD AND RELATED DEVICE THEREOF

(71) Applicant: HUAWEI TECHNOLOGIES CO., LTD., Guangdong (CN)

(72) Inventors: Zhijian Liang, Beijing (CN); Conger Chen, Shenzhen (CN); Yongwei Guo, Shenzhen (CN); Zhigui Wei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 343 days.

(21) Appl. No.: 18/183,998

(22) Filed: Mar. 15, 2023

(65) Prior Publication Data

US 2023/0231721 A1    Jul. 20, 2023

Related U.S. Application Data

(63) Continuation of application No. PCT/CN2020/115703, filed on Sep. 16, 2020.

(51) Int. Cl.
  *H04L 9/32* (2006.01)
  *H04L 9/08* (2006.01)

(52) U.S. Cl.
  CPC .......... *H04L 9/3242* (2013.01); *H04L 9/0825* (2013.01); *H04L 9/3247* (2013.01); *H04L 9/3268* (2013.01)

(58) Field of Classification Search
  CPC .............. H04L 9/3242; H04L 9/0825; H04L 9/3247; H04L 9/3268; H04L 2209/60;
  (Continued)

(56) References Cited

U.S. PATENT DOCUMENTS

| 2003/0077074 A1* | 4/2003 | Okamoto | H04N 21/4627 360/60 |
| 2009/0185682 A1 | 7/2009 | Kellerman et al. | |
| 2010/0228982 A1* | 9/2010 | Zhu | H04L 9/3271 713/175 |

(Continued)

FOREIGN PATENT DOCUMENTS

| CN | 109151508 A | 1/2019 | |
| WO | WO-2017104129 A1 * | 6/2017 | ............... G06F 1/00 |

OTHER PUBLICATIONS

EBU, "Tech 3292-s1, BISS—CA Basic Interoperable Scrambling System", Supplement 1: Conditional Access Mode Version 1.0, Retrieved from the internet: <https://tech.ebu.ch/docs/tech/tech3292s1.pdf> Mar. 2018 (Year: 2018).*

(Continued)

*Primary Examiner* — Hany S. Gadalla

(57) ABSTRACT

The technology of this application relates to a content transmission protection method and a related device, to avoid leakage of an audio/video stream when a transmit end and a receive end perform authentication. The method includes, in a process of establishing a transmission link between a transmit end and a receive end, the transmit end performs authentication key exchange with the receive end to obtain an authentication key. The transmit end performs session key agreement with the receive end based on the authentication key to obtain a session key. The transmit end performs authorization control on the receive end after establishment of the transmission link between the transmit end and the receive end is completed. The transmit end sends an encrypted audio/video stream to the receive end after the transmit end completes authorization control on the receive end. The encrypted audio/video stream is encrypted based on the session key.

20 Claims, 12 Drawing Sheets

(58) Field of Classification Search
CPC ............... H04L 9/0844; H04L 9/3265; H04N 21/25816; H04N 21/2347; H04N 21/6334; H04N 21/63775
See application file for complete search history.

(56) References Cited

U.S. PATENT DOCUMENTS

| | | | | |
|---|---|---|---|---|
| 2011/0145930 | A1* | 6/2011 | Gnech | H04L 63/10 |
| | | | | 726/28 |
| 2012/0144200 | A1* | 6/2012 | Liu | H04L 9/0844 |
| | | | | 713/171 |
| 2012/0183140 | A1 | 7/2012 | Devanand et al. | |
| 2019/0098016 | A1* | 3/2019 | Jeon | H04L 63/0823 |
| 2020/0012527 | A1* | 1/2020 | Hartsock | H04L 9/14 |
| 2020/0186361 | A1* | 6/2020 | Almgren | H04L 9/3242 |

OTHER PUBLICATIONS

High-bandwidth Digital Content Protection System, Interface Independent Adaptation. Revision 2.2, Oct. 16, 2012; total 78 pages.

Hitachi, Ltd et al: "Digital Transmission Content Protection Specification vol. 1(Informational Version)." "Revision 1.7 ED2, Jun. 5, 2013; total 84 pages.

European Search Report for EP Application No. 20953605 dated Sep. 12, 2023, 9 pages.

DTCP2 Volume 1 Specification, "Digital Transmission Content Protection 2 DTCP2) Specification Volume 1 Informational Version) (Revision 1.0.3)", Digital Transmission Licensing Administrator, Jul. 11, 2019, total 75 pages.

Digital Content Protection LLC,"High-bandwidth Digital Content Protection System Interface Independent Adaptation (Revision 2.3)", Mar. 2, 2018, total 112 pages.

Digital Content Protection LLC,"High-bandwidth Digital Content Protection System Mapping HDCP to HDMI (Revision 2.3)", Feb. 28, 2018, total 84 pages.

Wi-Fi Alliance," Wi-Fi Certified Miracast (TM) HDCP Interoperability Issue HDCP 2.2 Protocol Descriptor (Version 1.0)", Mar. 24, 2015, total 3 pages.

PCT International Search Report for Application No. PCT/CN2020/115703 dated Sep. 16, 2020, 12 pages.

* cited by examiner

CONTENT TRANSMISSION PROTECTION METHOD AND RELATED DEVICE THEREOF

CROSS-REFERENCE TO RELATED APPLICATIONS

This application is a continuation of International Application No. PCT/CN2020/115703, filed on Sep. 16, 2020, the disclosure of which is hereby incorporated by reference in its entirety.

TECHNICAL FIELD

Embodiments of this application relate to the field of multimedia technologies, and in particular, to a content transmission protection method and a related device thereof.

BACKGROUND

With development of a high-definition television (HDTV), lossless transmission of audio and video signals may be implemented by using a high-definition multimedia interface (HDMI) technology to adapt to a high bandwidth of the high-definition television. To prevent leakage of audio and video signals transmitted through an HDMI, a high-bandwidth digital content protection (HDCP) technology may be used for restriction, to ensure that the audio and video signals transmitted through the HDMI are not illegally copied.

Currently, most high-definition digital devices (for example, a high-definition digital television, a set-top box, a DVD player, a Blu-ray disc player, a personal computer, or a game console) each have an HDMI and can implement an HDCP function. When two devices (including a transmit end and a receive end) are needed to transmit an audio/video stream through an HDMI, HDCP authentication is needed. Specifically, after the two devices are connected, the transmit end may start to send an encrypted audio/video stream to the receive end. When the audio/video stream is transmitted between the two devices, the transmit end and the receive end may perform HDCP authentication at the same time based on information about the audio/video stream.

However, during HDCP authentication, the audio/video stream is transmitted. This may cause leakage of the audio/video stream.

SUMMARY

Embodiments of this application provide a content transmission protection method and a related device thereof, to avoid leakage of an audio/video stream when a transmit end and a receive end perform authentication.

A first aspect of embodiments of this application provides a content transmission protection method. The method includes:

In a process of establishing a transmission link between a transmit end and a receive end, the transmit end performs authentication key exchange with the receive end to obtain an authentication key. The transmit end performs session key agreement with the receive end based on the authentication key to obtain a session key. The transmit end performs authorization control on the receive end after establishment of the transmission link between the transmit end and the receive end is completed. The transmit end sends an encrypted audio/video stream to the receive end after the transmit end completes authorization control on the receive end. The encrypted audio/video stream is encrypted based on the session key.

It can be learned from the foregoing method that an authentication key exchange process and a session key agreement process between the transmit end and the receive end are implemented in the process of establishing the transmission link between the transmit end and the receive end, and an authorization control process and an audio/video stream transmission process between the transmit end and the receive end are implemented after establishment of the transmission link between the transmit end and the receive end is completed. Therefore, in this application, an authentication process and an audio/video stream transmission process between the transmit end and the receive end may be implemented in different time periods, and are two independent processes, so that, when the transmit end and the receive end perform authentication, the audio/video stream is not transmitted. This can avoid leakage of the audio/video stream.

In a possible implementation, that the transmit end performs authentication key exchange with the receive end to obtain an authentication key includes: The transmit end sends a first message to the receive end. The first message is used to request authentication. The transmit end receives a second message from the receive end. The second message includes a signature and a hash-based message authentication code (hmac) for authentication calculated by the receive end, and the signature indicates an identity of the receiver end. The transmit end calculates the authentication key and calculates an hmac for authentication based on the authentication key calculated by the transmit end. If the transmit end determines that the hmac for authentication calculated by the transmit end is the same as the hmac for authentication calculated by the receive end, the transmit end verifies the signature. If the transmit end successfully verifies the signature, the transmit end calculates an authentication key authentication code based on the authentication key calculated by the transmit end. The transmit end sends a third message to the receive end. Because the third message includes the authentication key authentication code calculated by the transmit end, the receive end may calculate the authentication key authentication code after receiving the third message, to determine whether the authentication key authentication code calculated by the transmit end is the same as the authentication key authentication code calculated by the receive end. If the authentication key authentication code calculated by the transmit end is the same as the authentication key authentication code calculated by the receive end, the receive end may determine that authentication succeeds. Then, the receive end may send a fourth message or no message to the transmit end. The fourth message indicates that authentication succeeds. After receiving the fourth message, the transmit end may determine that authentication succeeds, and cache the authentication key calculated by the transmit end. Alternatively, if the transmit end does not receive any message within a preset time, authentication succeeds by default, and the transmit end caches the authentication key calculated by the transmit end.

It can be learned from the foregoing implementation that: When the transmit end and the receive end perform authentication, authentication may be completed by comparing whether the hmac for authentication calculated by the transmit end is the same as the hmac for authentication calculated by the receive end and whether the authentication key authentication code calculated by the transmit end is the same as the authentication key authentication code calculated by the receive end. During authentication, authentication quantities, such as the hmac for authentication and the authentication key authentication code are considered to improve authentication reliability.

In a possible implementation, the first message includes a version number list. The second message further includes a version number of the receive end and an update time of a revocation list of the receive end. The version number of the receive end is in the version number list. That the transmit end calculates an hmac for authentication based on the authentication key calculated by the transmit end includes: calculating the hmac for authentication based on the version number of the receive end, the update time of the revocation list of the receive end, and the authentication key calculated by the transmit end. That the transmit end calculates an authentication key authentication code based on the authentication key calculated by the transmit end includes: calculating the authentication key authentication code based on the version number of the receive end and the authentication key calculated by the transmit end.

It can be learned from the foregoing implementation that, in an HDCP architecture, when the transmit end and the receive end perform authentication, related information about another device on the entire content transmission link needs to be collected, to complete authentication. However, in this application, when the transmit end and the receive end perform authentication, the hmac for authentication may be calculated based on the version number of the receive end, the update time of the revocation list of the receive end, and the authentication key, and the authentication key authentication code may be calculated based on the version number of the receive end and the authentication key. Therefore, information required for calculating the hmac for authentication and calculating the authentication key authentication code is information about the transmit end and the receive end device, and information about the another device on the entire content transmission link does not need to be obtained. Therefore, independent authentication may be implemented.

In a possible implementation, after authentication key exchange between the transmit end and the receive end succeeds, the method further includes: The transmit end sends a revocation list update message to the receive end when determining that an update time of a revocation list of the transmit end is different from the update time of the revocation list of the receive end. The revocation list update message includes the revocation list of the transmit end.

It can be learned from the foregoing implementation that: After the transmit end and the receive end complete authentication, if the transmit end determines that the update time of the revocation list of the transmit end is different from the update time of the revocation list of the receive end, the transmit end sends the revocation list update message including the revocation list of the transmit end to the receive end, so that the receive end replaces a locally stored revocation list with the revocation list of the transmit end, thereby completing revocation list update. This can ensure that revocation lists of devices of all levels on the entire content transmission link are of a same version, and improve reliability of the transmission link.

In a possible implementation, the first message further includes a current session identifier, a transmit end identifier, a public key list, and a fast authentication identifier, and the fast authentication identifier indicates the receive end to enter a fast authentication process or a common authentication process. For example, a format of the first message is shown as follows:

| Field | Length, in bytes (bytes) | Description |
| --- | --- | --- |
| msgId | 2 | ID of a first message, with a value of 0x01 |
| sessionId | 8 | Current session identifier |
| txId | 8 | Transmit end identifier |
| supportedVersionsNumbers | 1 | Number of protocol versions supported by a transmit end |
| supportedVersions | 2 * supportVersionNumbers | List of versions supported by the transmit end. Each version number includes two bytes. |
| xG0\|\|xG1 | 32 + 32 | Public key of the transmit end in an ECDH |
| enableFastAuth | 1 | Fast authentication identifier. When a value is 0x1, it indicates that a fast authentication process is started. When the value is 0x0, it indicates that the fast authentication process is forbidden. |

In a possible implementation, the second message further includes the current session identifier, a public key of the receive end, a device certificate authority (CA) certificate of the receive end, and a device certificate of the receive end. For example, a format of the second message is shown as follows:

| Field | Length, in bytes (bytes) | Description |
| --- | --- | --- |
| msgId | 2 | ID of a second message, with a value of 0x03 |
| sessionId | 8 | Current session identifier |
| version | 2 | Version number supported by a receive end |
| caCertLen | 4 | Length of a device CA certificate of the receive end |
| caCert | caCertLen | Device CA certificate of the receive end |
| crlThisUpdate | 8 | Update time of a revocation list, seconds from 00:00:00 on Jan. 1, 1970 to this time point |
| rxCertLen | 4 | Length of a device certificate of the receive end |
| rxCert | rcCertLen | Device certificate of the receive end |
| yG | 32 | Public key of the receive end in an ECDH |
| signAuth | 64 | Signature |
| hmacAuthLen | 2 | Length of hmacAuth |
| hmacAuth | hmacAuthLen | hmac for authentication calculated by the receive end. If an authentication key authKey has been cached, this field is set to hmacAuth. |

In a possible implementation, the session key includes: an odd key for content encryption and an even key for content encryption. The odd key for content encryption or the even key for content encryption is used to encrypt the audio/video stream.

In a possible implementation, that the transmit end performs authorization control on the receive end includes: The transmit end obtains authorization control information corresponding to the audio/video stream. The transmit end performs authorization control on the receive end in a unit of the audio/video stream based on the authorization control information corresponding to the audio/video stream. The authorization control information includes a security level, a copy limit, a retention time, a maximum cascading depth, and a maximum number of connected devices supported by a device of each level.

It can be learned from the foregoing implementation that: When needing to send different audio/video streams to the receive end, the transmit end may complete authorization control on the audio/video streams one by one for the receive end. Therefore, even if authorization control of an audio/video stream on the receive end fails, transmission of another audio/video stream on which authorization control has been completed is not affected. This improves fault tolerance of a solution.

In a possible implementation, the session key further includes an authorization information hmac key. After the transmit end performs authorization control of the audio/video stream on the receive end, the method further includes: The transmit end generates a tenth message based on the authorization information hmac key. The transmit end sends the tenth message to the receive end. The tenth message includes an identifier of an audio/video stream transmission channel corresponding to the audio/video stream and the authorization control information corresponding to the audio/video stream. The identifier of the audio/video stream transmission channel indicates the audio/video stream transmission channel corresponding to the audio/video stream. The tenth message indicates the receive end to perform, based on the audio/video stream transmission channel corresponding to the audio/video stream and the authorization control information corresponding to the audio/video stream, authorization control on a lower-level device of the receive end in a unit of the audio/video stream. For example, the tenth message is shown as follows:

| Field | Length, in bytes (bytes) | Description |
|---|---|---|
| msgId | 2 | ID of a tenth message, with a value of 0x07 |
| sessionId | 8 | Current session identifier |
| streamChannelId | 8 | Audio/Video stream transmission channel. Each audio/video stream corresponds to an audio/video stream transmission channel. Audio/video streams and audio/video stream transmission channels are bound one by one. |
| rciLen | 4 | Length of authorization control information |
| RCI | rciLen | Authorization control information |
| Depth | 4 | Current cascading depth |
| seqNum | 8 | Sequence number of a current request |

-continued

| Field | Length, in bytes (bytes) | Description |
|---|---|---|
| kLen | 4 | Length of a third authentication code |
| k | kLen | Third authentication code |

It can be learned from the foregoing implementation that: After receiving the tenth message from the transmit end, the receive end may determine, based on the identifier of the audio/video stream transmission channel in the tenth message, the audio/video stream transmission channel corresponding to the audio/video stream, and may perform, based on the audio/video stream transmission channel corresponding to the audio/video stream and the authorization control information corresponding to the audio/video stream, authorization control of the audio/video stream on the lower-level device of the receive end. After authorization control is completed, the receive end may transmit the audio/video stream to the lower-level device, which is equivalent to that the transmit end transmits the audio/video stream to the lower-level device of the receive end by using the receive end, to ensure transmission of the audio/video stream on the entire content transmission link.

In a possible implementation, that the transmit end sends an encrypted audio/video stream to the receive end includes: The transmit end sends encrypted data to the receive end. The encrypted data includes an encryption information header and at least one encrypted audio/video stream. The at least one encrypted audio/video stream is set in a unit of the audio/video stream transmission channel. The encryption information header includes a version of the encryption information header, an encryption method indication value, an encryption algorithm indication value, an encryption mode, a reserved field, and a counter.

It can be learned from the foregoing implementation that the encrypted data sent by the transmit end to the receive end includes the encryption information header and the at least one encrypted audio/video stream, and the receive end may determine encryption information of an audio/video stream based on the encryption information header. Because the at least one encrypted audio/video stream is set in a unit of the audio/video stream transmission channel, in other words, encryption information in more dimensions such as the audio/video stream transmission channel is considered in an encryption process, security of content transmission is improved.

In a possible implementation, that the transmit end performs authentication key exchange with the receive end to obtain an authentication key includes: The transmit end sends a first message to the receive end. The first message includes a current session identifier, a transmit end identifier, a version number list, a public key list, and a fast authentication identifier. The transmit end receives a second message from the receive end. The second message includes the current session identifier, a version number of the receive end, an update time of a revocation list of the receive end, a public key of the receive end, a signature, and an hmac for authentication calculated by the receive end, and the version number of the receive end is in the version number list. The transmit end calculates the authentication key based on a private key of the transmit end and the public key of the receive end, and calculates an hmac for authentication based on the public key of the receive end, a public key of the transmit end, the transmit end identifier, the version number of the receive end, the current session identifier, the update time of the revocation list of the receive end, and the authentication key calculated by the transmit end, and the public key of the transmit end is determined based on the public key list. If the transmit end determines that the hmac for authentication calculated by the transmit end is the same as the hmac for authentication calculated by the receive end, the transmit end verifies the signature. If the transmit end successfully verifies the signature, the transmit end calculates an authentication key authentication code based on the transmit end identifier, the version number of the receive end, the current session identifier, and the authentication key calculated by the transmit end. The transmit end sends a third message to the receive end. The third message includes the current session identifier and the authentication key authentication code calculated by the transmit end. The transmit end caches the current session identifier and the authentication key calculated by the transmit end.

In a possible implementation, before the transmit end calculates the authentication key based on a private key of the transmit end and the public key of the receive end, the method further includes: The transmit end verifies a device CA certificate and a device certificate of the receive end based on a preset root CA certificate, to obtain an identifier of the device certificate of the receive end. If the transmit end successfully verifies the device CA certificate of the receive end and the device certificate of the receive end, the transmit end detects whether the identifier of the device certificate of the receive end is in the revocation list. That the transmit end calculates the authentication key based on a private key of the transmit end and the public key of the receive end includes: If the transmit end determines that the identifier of the device certificate of the receive end is in the revocation list, the transmit end calculates the authentication key based on the private key of the transmit end and the public key of the receive end.

In a possible implementation, the method further includes: The transmit end caches the version of the receive end, the CA certificate of the receive end, the device certificate of the receive end, and the identifier of the device certificate of the receive end.

In a possible implementation, that the transmit end verifies the signature includes: verifying the signature based on the public key corresponding to the device certificate of the receive end.

In a possible implementation, after the transmit end sends a first message to the receive end, the method further includes: The transmit end receives a fifth message from the transmit end. The fifth message includes the current session identifier, the version number of the receive end, the device CA certificate of the receive end, the device certificate of the receive end, and an hmac for fast authentication calculated by the receive end. If the transmit end determines that the device CA certificate of the receive end and the device certificate of the receive end are cached, the transmit end detects whether the identifier of the device certificate of the receive end is in the revocation list. If the transmit end determines whether the identifier of the device certificate of the receive end is in the revocation list, the transmit end calculates an hmac for fast authentication based on the transmit end identifier, the version number of the receive end, the current session identifier, the device certificate of the receive end, and the cached authentication key. If the transmit end determines that the hmac for fast authentication calculated by the transmit end is the same as the hmac for fast authentication calculated by the receive end, the transmit end determines that authentication of the receive end is in a successful status.

In a possible implementation, after the transmit end sends the current session identifier and the authentication key calculated by the transmit end, or after the transmit end determines that authentication of the receive end is a successful status, the method further includes: The transmit end randomly generates an odd key for content encryption, an even key for content encryption, an authorization information hmac key, and an initialization variable. The transmit end calculates a first authentication code based on the current session identifier, the odd key for content encryption, the even key for content encryption, the authorization information hmac key, the initialization variable, and an hmac key. The hmac key is generated based on the cached authentication key. The transmit end calculates a session key ciphertext based on the current session identifier, the odd key for content encryption, the even key for content encryption, the authorization information hmac key, the initialization variable, the first authentication code calculated by the transmit end, and an encryption key. The encryption key is generated based on the cached authentication key. The transmit end sends a seventh message to the receive end. The seventh message includes the current session identifier, the initialization variable, and the session key ciphertext. The transmit end receives an eighth message from the receive end. The eighth message includes the current session identifier and a second authentication code calculated by the receive end. The transmit end calculates the second authentication code based on the current session identifier, the odd key for content encryption, the even key for content encryption, the authorization information hmac key, and the hmac key. If the transmit end determines that the second authentication code calculated by the transmit end is the same as the second authentication code calculated by the receive end, the transmit end determines the odd key for content encryption, the even key for content encryption, and the authorization information hmac key as the session keys.

In a possible implementation, after the transmit end determines the odd key for content encryption, the even key for content encryption, and the authorization information hmac key as session keys, the method further includes: If the transmit end completes authorization of a target audio/video stream to the receive end, the transmit end calculates a third authentication code based on the current session identifier, an audio/video stream transmission channel corresponding to the target audio/video stream, authorization control information, a current cascading depth, a sequence number of a current request, and the cached authorization information hmac key. The transmit end sends a tenth message to the receive end. The tenth message includes the current session identifier, the audio/video stream transmission channel corresponding to the target audio/video stream, the authorization control information, the current cascading depth, the sequence number of the current request, and third authentication code calculated by the transmit end. The transmit end receives an eleventh message from the receive end. The eleventh message includes the current session identifier and a fourth verification code calculated by the receive end. The transmit end calculates a fourth authentication code based on the current session identifier, the audio/video stream transmission channel corresponding to the target audio/video stream, the authorization control information, the current cascading depth, the sequence number of the current request increased by 1, and the cached authorization information hmac key. If the transmit end determines that the fourth authentication code calculated by the transmit end is the same as the fourth authentication code calculated by the receive end, the transmit end caches the current session identifier and the sequence number of the current request.

In a possible implementation, after the transmit end determines the odd key for content encryption, the even key for content encryption, and the authorization information hmac key as session keys, the method further includes: If the transmit end completes authorization of a target audio/video stream to the receive end, the transmit end sends an encrypted data frame to the receive end. The encrypted data frame includes the target audio/video stream encrypted based on the odd key for content encryption or the even key for content encryption.

In a possible implementation, the method further includes: The transmit end sends a thirteenth message to the receive end. The thirteenth message includes a revocation list of the transmit end. The transmit end receives a fourteenth message from the receive end. The fourteenth message indicates that the revocation list of the receive end is successfully updated.

A second aspect of embodiments of this application provides a content transmission protection method. The method includes: In a process of establishing a transmission link between a transmit end and a receive end, the receive end performs authentication key exchange with the transmit end to obtain an authentication key. The receive end performs session key agreement with the transmit end based on the authentication key to obtain a session key. The receive end responds to authorization control of the transmit end after establishment of the transmission link between the transmit end and the receive end is completed. The receive end receives an encrypted audio/video stream from the transmit end after the transmit end completes authorization control on the receive end. The encrypted audio/video stream is encrypted based on the session key.

It can be learned from the foregoing method that an authentication key exchange process and a session key agreement process between the transmit end and the receive end are implemented in the process of establishing the transmission link between the transmit end and the receive end, and an authorization control process and an audio/video stream transmission process between the transmit end and the receive end are implemented after establishment of the transmission link between the transmit end and the receive end is completed. Therefore, in this application, an authentication process and the audio/video stream transmission process between the transmit end and the receive end may be implemented in different time periods, and are two independent processes, so that, when the transmit end and the receive end perform authentication, the audio/video stream is not transmitted. This can avoid leakage of the audio/video stream.

In a possible implementation, that the receive end performs authentication key exchange with the transmit end to obtain an authentication key includes: The receive end receives a first message from the transmit end. The first message is used to request authentication. The receive end calculates a signature and the authentication key, and calculates an hmac for authentication based on the authentication key calculated by the receive end. The receive end sends a second message to the transmit end. The second message includes the signature and the hmac for authentication calculated by the receive end, and the signature indicates an identity of the receive end. The receive end receives a third message from the transmit end. The third message includes an authentication key authentication code calculated by the transmit end. The receive end calculates an authentication key authentication code based on the authentication key calculated by the receive end. If determining that the authentication key authentication code calculated by the transmit end is the same as the authentication key authentication code calculated by the receive end, the receive end caches the authentication key calculated by the receive end.

It can be learned from the foregoing implementation that: When the transmit end and the receive end perform authentication, authentication may be completed by comparing whether the hmac for authentication calculated by the transmit end is the same as the hmac for authentication calculated by the receive end and whether the authentication key authentication code calculated by the transmit end is the same as the authentication key authentication code calculated by the receive end. During authentication, authentication quantities, such as the hmac for authentication and the authentication key authentication code are considered to improve authentication reliability.

In a possible implementation, the first message includes a version number list. That the receive end calculates a signature includes: if the receive end determines that a version number of the receive end is in the version number list, calculating the signature based on the version number of the receive end and an update time of a revocation list of the receive end.

In a possible implementation, that the receive end calculates an hmac for authentication based on the authentication key calculated by the receive end includes: calculating the hmac for authentication based on the version number of the receive end, the update time of the revocation list of the receive end, and the authentication key calculated by the receive end. That the receive end calculates an authentication key authentication code based on the authentication key calculated by the receive end includes: calculating the authentication key authentication code based on the version number of the receive end and the authentication key calculated by the receive end.

It can be learned from the foregoing implementation that, in an HDCP architecture, when the transmit end and the receive end perform authentication, related information about another device on the entire content transmission link needs to be collected, to complete authentication. However, in this application, when the transmit end and the receive end perform authentication, the hmac for authentication may be calculated based on the version number of the receive end, the update time of the revocation list of the receive end, and the authentication key, and the authentication key authentication code may be calculated based on the version number of the receive end and the authentication key. Therefore, information required for calculating the hmac for authentication and calculating the authentication key authentication code is information about the transmit end and the receive end device, and information about the another device on the entire content transmission link does not need to be obtained. Therefore, independent authentication may be implemented.

In a possible implementation, after authentication key exchange between the transmit end and the receive end succeeds, the method further includes: The receive end receives a revocation list update message from the transmit end. The revocation list update message includes a revocation list of the transmit end. The receive end replaces the revocation list of the receive end with the revocation list of the transmit end. The receive end verifies a certificate of a lower-level device of the receive end by using the revocation list of the transmit end.

It can be learned from the foregoing implementation that: After the transmit end and the receive end complete authentication, if the transmit end determines that an update time of the revocation list of the transmit end is different from the update time of the revocation list of the receive end, the transmit end sends the revocation list update message including the revocation list of the transmit end to the receive end, so that the receive end replaces a locally stored revocation list with the revocation list of the transmit end, thereby completing revocation list update. This can ensure that revocation lists of devices of all levels on the entire content transmission link are of a same version, and improve reliability of the transmission link.

In a possible implementation, the first message further includes a current session identifier, a transmit end identifier, a public key list, and a fast authentication identifier, and the fast authentication identifier indicates the receive end to enter a fast authentication process or a common authentication process.

In a possible implementation, the second message further includes the current session identifier, a public key of the receive end, a device certificate authority (CA) certificate of the receive end, and a device certificate of the receive end.

In a possible implementation, the session key includes: an odd key for content encryption and an even key for content encryption. The odd key for content encryption or the even key for content encryption is used to decrypt the encrypted audio/video stream.

In a possible implementation, that the receive end responds to authorization control of the transmit end includes: The receive end responds to authorization control performed by the transmit end in a unit of the audio/video stream based on authorization control information corresponding to the audio/video stream. The authorization control information includes a security level, a copy limit, a retention time, a maximum cascading depth, and a maximum number of connected devices supported by a device of each level.

It can be learned from the foregoing implementation that: When needing to send different audio/video streams to the receive end, the transmit end may complete authorization control on the audio/video streams one by one for the receive end. Therefore, even if authorization control of an audio/video stream on the receive end fails, transmission of another audio/video stream on which authorization control has been completed is not affected. This improves fault tolerance of a solution.

In a possible implementation, after the receive end responds to authorization control of the transmit end, the method further includes: The receive end receives a tenth message from the transmit end. The tenth message includes an identifier of an audio/video stream transmission channel corresponding to the audio/video stream and the authorization control information corresponding to the audio/video stream. The identifier of the audio/video stream transmission channel indicates the audio/video stream transmission channel corresponding to the audio/video stream. The receive end performs, based on the audio/video stream transmission channel corresponding to the audio/video stream and the authorization control information corresponding to the audio/video stream, authorization control on the lower-level device of the receive end in a unit of the audio/video stream.

It can be learned from the foregoing implementation that: After receiving the tenth message from the transmit end, the receive end may determine, based on the identifier of the audio/video stream transmission channel in the tenth message, the audio/video stream transmission channel corresponding to the audio/video stream, and may perform, based on the audio/video stream transmission channel correspond-ing to the audio/video stream and the authorization control information corresponding to the audio/video stream, authorization control of the audio/video stream on the lower-level device of the receive end. After authorization control is completed, the receive end may transmit the audio/video stream to the lower-level device, which is equivalent to that the transmit end transmits the audio/video stream to the lower-level device of the receive end by using the receive end, to ensure transmission of the audio/video on the entire content transmission link.

In a possible implementation, that the receive end receives an encrypted audio/video stream from the transmit end includes:

The receive end receives encrypted data from the transmit end. The encrypted data includes an encryption information header and at least one encrypted audio/video stream. The at least one encrypted audio/video stream is set in a unit of the audio/video stream transmission channel. The encryption information header includes a version of the encryption information header, an encryption method indication value, an encryption algorithm indication value, an encryption mode, a reserved field, and a counter.

It can be learned from the foregoing implementation that the encrypted data sent by the transmit end to the receive end includes the encryption information header and the at least one encrypted audio/video stream, and the receive end may determine encryption information of the audio stream based on the encryption information header. Because the at least one encrypted audio/video stream is set in a unit of the audio/video stream transmission channel, in other words, encryption information in more dimensions such as the audio/video stream transmission channel is considered in an encryption process, security of content transmission is improved.

In a possible implementation, that the receive end performs authentication key exchange with the transmit end to obtain an authentication key includes: The receive end receives a first message from the transmit end. The first message includes a current session identifier, a transmit end identifier, a version number list, a public key list, and a fast authentication identifier. If determining that a version number of the receive end is in the version number list, the receive end detects, based on the fast authentication identifier, whether the authentication key is cached. If determining that no authentication key is cached, the receive end calculates a signature, and calculates the authentication key based on a private key of the receive end and a public key of the transmit end. The public key of the transmit end is determined based on the version number list. The receive end calculates an hmac for authentication based on a public key of the receive end, the public key of the transmit end, the transmit end identifier, the version number of the receive end, the current session identifier, an update time of a revocation list of the receive end, and the authentication key calculated by the receive end. The receive end sends a second message to the transmit end. The second message includes the current session identifier, the version number of the receive end, the update time of the revocation list, the public key of the receive end, the signature, and the hmac for authentication calculated by the receive end. The receive end receives a third message from the transmit end. The third message includes the current session identifier and the authentication key authentication code calculated by the transmit end. The receive end calculates an authentication key authentication code based on the transmit end identifier, the version number of the receive end, the current session identifier, and the authentication key calculated by the receive end. If determining that the authentication key authentication code calculated by the transmit end is the same as the authentication key authentication code calculated by the receive end, the receive end caches the current session identifier, the authentication key calculated by the receive end, the transmit end identifier, and the version of the receive end.

In a possible implementation, calculating the signature includes: calculating the signature based on the public key of the receive end, the public key of the transmit end, the transmit end identifier, the version number of the receive end, the current session identifier, the update time of the revocation list of the receive end, and the private key corresponding to a device certificate of the receive end.

In a possible implementation, if determining that the version number of the receive end is in the version number list, before the receive end detects, based on the fast authentication identifier, whether the authentication key is cached, the method further includes: If determining that a cached session identifier is different from the current session identifier, the receive end detects whether the version number of the receive end is in the version number list.

In a possible implementation, if determining that the version number of the receive end is in the version number list, after the receive end detects, based on the fast authentication identifier, whether the authentication key is cached, the method further includes: If determining that the authentication key is cached, the receive end calculates an hmac for fast authentication based on the transmit end identifier, the version number of the receive end, the current session identifier, the device certificate of the receive end, and the cached authentication key. The receive end sends a fifth message to the transmit end. The fifth message includes the current session identifier, the version number of the receive end, a device CA certificate of the receive end, the device certificate of the receive end, and the hmac for fast authentication calculated by the receive end.

In a possible implementation, after the receive end caches the current session identifier, the authentication key calculated by the receive end, the transmit end identifier, and the version of the receive end, or after the receive end sends a fifth message to the transmit end, the method further includes: The receive end receives a seventh message from the transmit end. The seventh message includes the current session identifier, an initialization variable, and a session key ciphertext. The receive end decrypts the session key ciphertext based on the initialization variable and an encryption password to obtain an odd key for content encryption, an even key for content encryption, an authorization information hmac key, and a first authentication code calculated by the transmit end. The encryption password is generated based on the cached authentication key. The receive end calculates a first authentication code based on the current session identifier, the odd key for content encryption, the even key for content encryption, the authorization information hmac key, the initialization variable, and an hmac key. The hmac key is generated based on the cached authentication key. If the receive end determines that the first authentication code calculated by the receive end is the same as the first authentication code calculated by the transmit end, the receive end calculates a second authentication code based on the current session identifier, the odd key for content encryption, the even key for content encryption, the authorization information hmac key, and the hmac key. The receive end sends an eighth message to the transmit end. The eighth message includes the current session identifier and the second authentication code calculated by the receive end.

In a possible implementation, after the receive end sends an eighth message to the transmit end, the method further includes: The receive end receives a tenth message from the transmit end. The tenth message includes the current session identifier, an audio/video stream transmission channel corresponding to a target audio/video stream, authorization control information, a current cascading depth, a sequence number of a current request, and a third authentication code calculated by the transmit end. The receive end calculates a third authentication code based on the current session identifier, the audio/video stream transmission channel corresponding to the target audio/video stream, the authorization control information, the current cascading depth, the sequence number of the current request, and the cached authorization information hmac key. If determining that the third authentication code calculated by the transmit end is the same as the third authentication code calculated by the receive end, the receive end calculates a fourth authentication code based on the current session identifier, the audio/video stream transmission channel corresponding to the target audio/video stream, the authorization control information, the current cascading depth, the sequence number of the current request increased by 1, and the cached authorization information hmac key. The receive end sends an eleventh message to the transmit end. The eleventh message includes the current session identifier and the fourth verification code calculated by the receive end. The receive end receives and caches the current session identifier, the audio/video stream transmission channel corresponding to the target audio/video stream, the authorization control information, and the updated current cascading depth.

In a possible implementation, after the receive end sends an eighth message to the transmit end, the method further includes: The receive end receives an encrypted data frame from the transmit end. The encrypted data frame includes the target audio/video stream encrypted based on the odd key for content encryption or the even key for content encryption.

In a possible implementation, the method further includes: The receive end receives a thirteenth message from the transmit end. The thirteenth message includes a revocation list of the transmit end. If the receive end determines that an update time of the revocation list of the transmit end is greater than the update time of the revocation list of the receive end, the receive end replaces the revocation list of the receive end with the revocation list of the transmit end. The receive end sends a fourteenth message to the transmit end. The fourteenth message indicates that the revocation list of the receive end is successfully updated.

A third aspect of embodiments of this application provides a content transmission protection apparatus. The apparatus includes: an authentication module, configured to: in a process of establishing a transmission link between a transmit end and a receive end, perform authentication key exchange with the receive end to obtain an authentication key, where the authentication module is further configured to perform session key agreement with the receive end based on the authentication key to obtain a session key; an authorization module, configured to perform authorization control on the receive end after establishment of the transmission link between the transmit end and the receive end is completed; and an encryption module, configured to send an encrypted audio/video stream to the receive end after the transmit end completes authorization control on the receive end. The encrypted audio/video stream is encrypted based on the session key.

In a possible implementation, the authentication module is specifically configured to: send a first message to the receive end, where the first message is used to request authentication; receive a second message from the receive end, where the second message includes a signature and a hash-based message authentication code hmac for authentication calculated by the receive end, and the signature indicates an identity of the receive end; calculate the authentication key and calculate an hmac for authentication based on the authentication key calculated by the transmit end; verify the signature if it is determined that the hmac for authentication calculated by the transmit end is the same as the hmac for authentication calculated by the receive end; if the signature is successfully verified, calculate an authentication key authentication code based on the authentication key calculated by the transmit end; and send a third message to the receive end. The third message includes the authentication key authentication code calculated by the transmit end.

In a possible implementation, the first message includes a version number list. The second message further includes a version number of the receive end and an update time of a revocation list of the receive end. The version number of the receive end is in the version number list. The authentication module is specifically configured to: calculate the hmac for authentication based on the version number of the receive end, the update time of the revocation list of the receive end, and the authentication key calculated by the transmit end; and calculate the authentication key authentication code based on the version number of the receive end and the authentication key calculated by the transmit end.

In a possible implementation, the authentication module is further configured to: send a revocation list update message to the receive end when determining that an update time of a revocation list of the transmit end is different from the update time of the revocation list of the receive end. The revocation list update message includes the revocation list of the transmit end.

In a possible implementation, the authorization module is specifically configured to: obtain authorization control information corresponding to the audio/video stream; and perform, based on the authorization control information corresponding to the audio/video stream, authorization control on the receive end in a unit of the audio/video stream, where the authorization control information includes a security level, a copy limit, a retention time, a maximum cascading depth, and a maximum number of connected devices supported by a device of each level.

In a possible implementation, the authorization module is further configured to send a tenth message to the receive end. The tenth message includes an identifier of an audio/video stream transmission channel corresponding to the audio/video stream and the authorization control information corresponding to the audio/video stream. The identifier of the audio/video stream transmission channel indicates the audio/video stream transmission channel corresponding to the audio/video stream. The tenth message indicates the receive end to perform, based on the audio/video stream transmission channel corresponding to the audio/video stream and the authorization control information corresponding to the audio/video stream, authorization control on a lower-level device of the receive end in a unit of the audio/video stream.

In a possible implementation, the encryption module is specifically configured to send encrypted data to the receive end. The encrypted data includes an encryption information header and at least one encrypted audio/video stream. The at least one encrypted audio/video stream is set in a unit of the audio/video stream transmission channel. The encryption information header includes a version of the encryption information header, an encryption method indication value, an encryption algorithm indication value, an encryption mode, a reserved field, and a counter.

In a possible implementation, the first message further includes a current session identifier, a transmit end identifier, a public key list, and a fast authentication identifier, and the fast authentication identifier indicates the receive end to enter a fast authentication process or a common authentication process.

In a possible implementation, the second message further includes the current session identifier, a public key of the receive end, a device certificate authority (CA) certificate of the receive end, and a device certificate of the receive end.

In a possible implementation, the session key includes: an odd key for content encryption and an even key for content encryption. The odd key for content encryption or the even key for content encryption is used to encrypt the audio/video stream.

A fourth aspect of embodiments of this application provides a content transmission protection apparatus. The apparatus includes: an authentication module, configured to: in a process of establishing a transmission link between a transmit end and a receive end, perform authentication key exchange with the transmit end to obtain an authentication key, where the authentication module is further configured to perform session key agreement with the transmit end based on the authentication key to obtain a session key; an authorization module, configured to respond to authorization control of the transmit end after establishment of the transmission link between the transmit end and the receive end is completed; and a decryption module, configured to receive an encrypted audio/video stream from the transmit end after the transmit end completes authorization control on the receive end. The encrypted audio/video stream is encrypted based on the session key.

In a possible implementation, the authentication module is specifically configured to: receive a first message from the transmit end, where the first message is used to request authentication; calculate a signature and the authentication key, and calculate an hmac for authentication based on the authentication key calculated by the receive end; send a second message to the transmit end, where the second message includes the signature and the hmac for authentication calculated by the receive end, and the signature indicates an identity of the receive end; receive a third message from the transmit end, where the third message includes an authentication key authentication code calculated by the transmit end; calculate an authentication key authentication code based on the authentication key calculated by the receive end; and if it is determined that the authentication key authentication code calculated by the transmit end is the same as the authentication key authentication code calculated by the receive end, cache the authentication key calculated by the receive end.

In a possible implementation, the first message includes a version number list. The authentication module is specifically configured to: if it is determined that a version number of the receive end is in the version number list, calculate the signature based on the version number of the receive end and an update time of a revocation list of the receive end.

In a possible implementation, the authentication module is specifically configured to: calculate the hmac for authentication based on the version number of the receive end, the update time of the revocation list of the receive end, and the authentication key calculated by the receive end, and calculate the authentication key authentication code based on the version number of the receive end and the authentication key calculated by the receive end.

In a possible implementation, the authentication module is further configured to: receive a revocation list update message from the transmit end, where the revocation list update message includes a revocation list of the transmit end; replace the revocation list of the receive end with the revocation list of the transmit end; and verify a certificate of a lower-level device of the receive end by using the revocation list of the transmit end.

In a possible implementation, the authorization module is specifically configured to respond to authorization control performed by the transmit end in a unit of the audio/video stream based on authorization control information corresponding to the audio/video stream. The authorization control information includes a security level, a copy limit, a retention time, a maximum cascading depth, and a maximum number of connected devices supported by a device of each level.

In a possible implementation, the authorization module is further configured to: receive a tenth message from the transmit end, where the tenth message includes an identifier of an audio/video stream transmission channel corresponding to the audio/video stream and the authorization control information corresponding to the audio/video stream, and the identifier of the audio/video stream transmission channel indicates the audio/video stream transmission channel corresponding to the audio/video stream; and perform, based on the audio/video stream transmission channel corresponding to the audio/video stream and the authorization control information corresponding to the audio/video stream, authorization control on the lower-level device of the receive end in a unit of the audio/video stream.

In a possible implementation, the decryption module is specifically configured to receive encrypted data from the transmit end. The encrypted data includes an encryption information header and at least one encrypted audio/video stream. The at least one encrypted audio/video stream is set in a unit of the audio/video stream transmission channel. The encryption information header includes a version of the encryption information header, an encryption method indication value, an encryption algorithm indication value, an encryption mode, a reserved field, and a counter.

In a possible implementation, the first message further includes a current session identifier, a transmit end identifier, a public key list, and a fast authentication identifier, and the fast authentication identifier indicates the receive end to enter a fast authentication process or a common authentication process.

In a possible implementation, the second message further includes the current session identifier, a public key of the receive end, a device certificate authority (CA) certificate of the receive end, and a device certificate of the receive end.

In a possible implementation, the session key includes: an odd key for content encryption and an even key for content encryption. The odd key for content encryption or the even key for content encryption is used to encrypt the audio/video stream.

A fifth aspect of embodiments of this application provides a content transmission protection apparatus. The apparatus includes a processor and a transmission interface. The processor is configured to invoke program instructions stored in a memory, to perform the method in any one of the first aspect or the possible implementations of the first aspect, or any one of the second aspect or the possible implementations of the second aspect.

A sixth aspect of embodiments of this application provides a computer-readable storage medium, including instructions. When the instructions are run on a computer or a processor, the computer or the processor is enabled to perform the method in any one of the first aspect or the possible implementations of the first aspect, or any one of the second aspect or the possible implementations of the second aspect.

A seventh aspect of embodiments of this application provides a computer program product including instructions. The computer program product includes program instructions. When the program instructions are run on a computer or a processor, the computer or the processor is enabled to perform the method in any one of the first aspect or the possible implementations of the first aspect, or any one of the second aspect or the possible implementations of the second aspect.

In embodiments of this application, an authentication key exchange process and a session key agreement process between the transmit end and the receive end are implemented in the process of establishing the transmission link between the transmit end and the receive end, and an authorization control process and an audio/video stream transmission process between the transmit end and the receive end are implemented after establishment of the transmission link between the transmit end and the receive end is completed. Therefore, an authentication process and the audio/video stream transmission process between the transmit end and the receive end may be implemented in different time periods, and are two independent processes, so that, when the transmit end and the receive end perform authentication, the audio/video stream is not transmitted. This can avoid leakage of the audio/video stream.

DESCRIPTION OF EMBODIMENTS

The following describes in detail technical solutions in embodiments of this application with reference to the accompanying drawings in embodiments of this application.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include", "contain" and any other variants thereof mean to cover a non-exclusive inclusion, so that a process, method, system, product, or device that includes a series of units is not necessarily limited to those units, but may include other units not expressly listed or inherent to such a process, method, product, or device.

Figure 1:
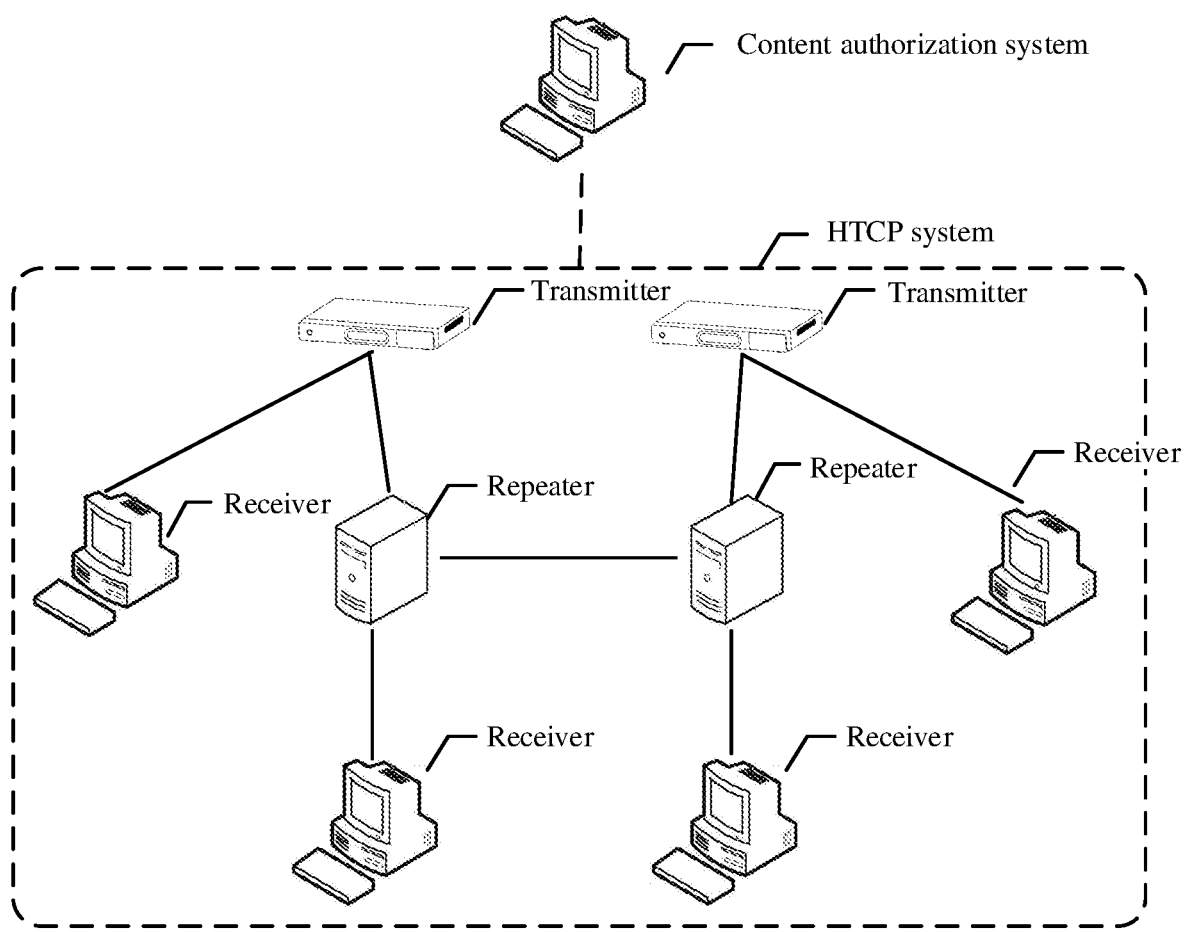
FIG. 1 is an example schematic diagram of a structure of an HTCP system according to an embodiment of this application.

Embodiments of this application may be applied to a home network transmission content protection (HTCP) system. FIG. 1 is a schematic diagram of a structure of an HTCP system according to an embodiment of this application. As shown in FIG. 1, the HTCP system includes three types of devices: a transmitter, a repeater, and a receiver. Generally, a transmitter is used as a start point of audio/video stream transmission, a receiver is used as an end point of audio/video stream transmission, and a repeater is used as a bridge device (e.g., relay device) between the transmitter and the receiver to extend a secure transmission distance between the transmitter and the receiver. Based on this, a transmitter is used as a level-1 device, and a repeater or a receiver is used as a lower-level device. A distributed system shown in FIG. 1 may be formed by increasing a number of devices and cascading devices of a plurality of levels. In the distributed system, a relationship between an upper-level device and a lower-level device is formed between a transmitter and a receiver, between the transmitter and a repeater, between repeaters, or between the repeater and the receiver, and audio/video stream transmission can be implemented. In embodiments of this application, a transmit end is an upper-level device, and a receive end is a lower-level device.

In addition, the HTCP system is further connected to a content authorization system. The content authorization system may interact with each device in the HTCP system, and each device is provided with at least one interface for receiving information delivered by the content authorization system. For example, the content authorization system may send authorization information to the transmitter through an authorization interface of the transmitter. For another example, the content authorization system may further update a revocation list of the transmitter through a revocation list update interface of the transmitter.

Figure 2:
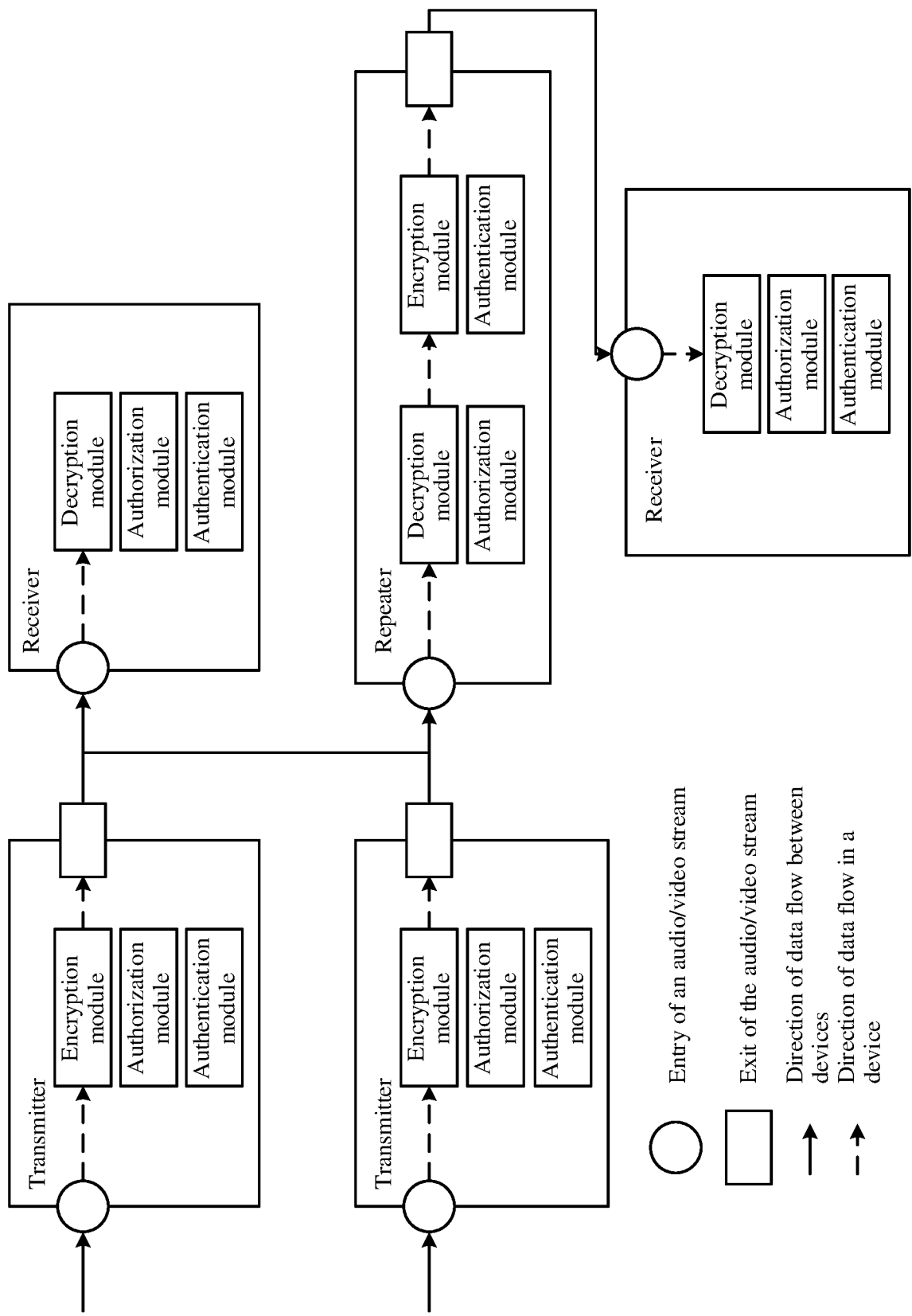
FIG. 2 is an example schematic diagram of another structure of an HTCP system according to an embodiment of this application.

For further understanding, the following further describes an HTCP system with reference to FIG. 2. FIG. 2 is a schematic diagram of another structure of an HTCP system according to an embodiment of this application. As shown in FIG. 2:

(1) A transmitter includes an authentication module, an authorization module, and an encryption module. The authentication module may perform identity authentication and key agreement on a lower-level device. The authorization module may perform authorization control on the lower-level device based on authorization information of an audio/video stream. The encryption module may encrypt audio/video stream data by using an agreed session key, and send the encrypted audio/video stream data to the lower-level device. If the lower-level device of the transmitter is a repeater, the authentication module may further update a revocation list of the lower-level device.

(2) A receiver includes an authentication module, an authorization module, and a decryption module. The authentication module supports an upper-level device in completing identity authentication and key agreement. The authorization module may support the upper-level device in completing authorization control. The decryption module decrypts the audio/video stream data from the upper-level device by using the agreed session key.

(3) A repeater includes an authentication module, an authorization module, an encryption module, and a decryption module. When the repeater serves as the lower-level device of the transmitter, the transmitter is an upper-level device. The authentication module may support completion of identity authentication and key agreement. The authorization module may support the upper-level device in completing authorization control. The decryption module decrypts the audio/video stream data from the upper-level device by using the agreed session key. The authentication module may support the upper-level device in completing revocation list update. When the repeater serves as an upper-level device of the receiver, the receiver or the repeater is a lower-level device. The authentication module may perform identity authentication and key agreement on the lower-level device. The authorization module may perform authorization control on the lower-level device based on the authorization information of the audio/video stream. The encryption module may re-encrypt the audio/video stream data by using the agreed session key, and send the encrypted audio/video stream data to the lower-level device.

In FIG. 2, after the transmitter, the repeater, and the receiver are connected, an audio/video stream transmission link is formed, to support unidirectional transmission of the audio/video stream. For example, a home network includes a set-top box, a TV set, and a relay device. The set-top box may serve as a start point of audio/video stream transmission. The TV set may serve as an end point of audio/video stream transmission. The relay device may be disposed between the set-top box and the TV set. When the set-top box and the TV set form an upper-level device and a lower-level device, after HTCP protocol-based interaction (briefly referred to as protocol interaction below, including the foregoing identity authentication, key agreement, authorization control, and the like) is completed together, the set-top box may securely send the encrypted audio/video stream to the TV set. When the set-top box and the relay device form an upper-level device and a lower-level device, and the relay device and the TV set form an upper-level device and a lower-level device, after the set-top box and the relay device jointly complete protocol interaction, and after the relay device and the TV set jointly complete protocol interaction, the set-top box may securely send the encrypted audio/video stream to the TV set by using the relay device.

Further, devices in the HTCP system may be classified into a transmit end and a receive end. The transmit end initiates a protocol interaction request and completes encryption of the audio/video stream. The receive end responds to the request from the transmit end and decrypts the audio/video stream. It should be noted that the transmitter is usually a transmit end, the receiver is usually a receive end, and the repeater may be either a transmit end or a receive end.

Figure 3:
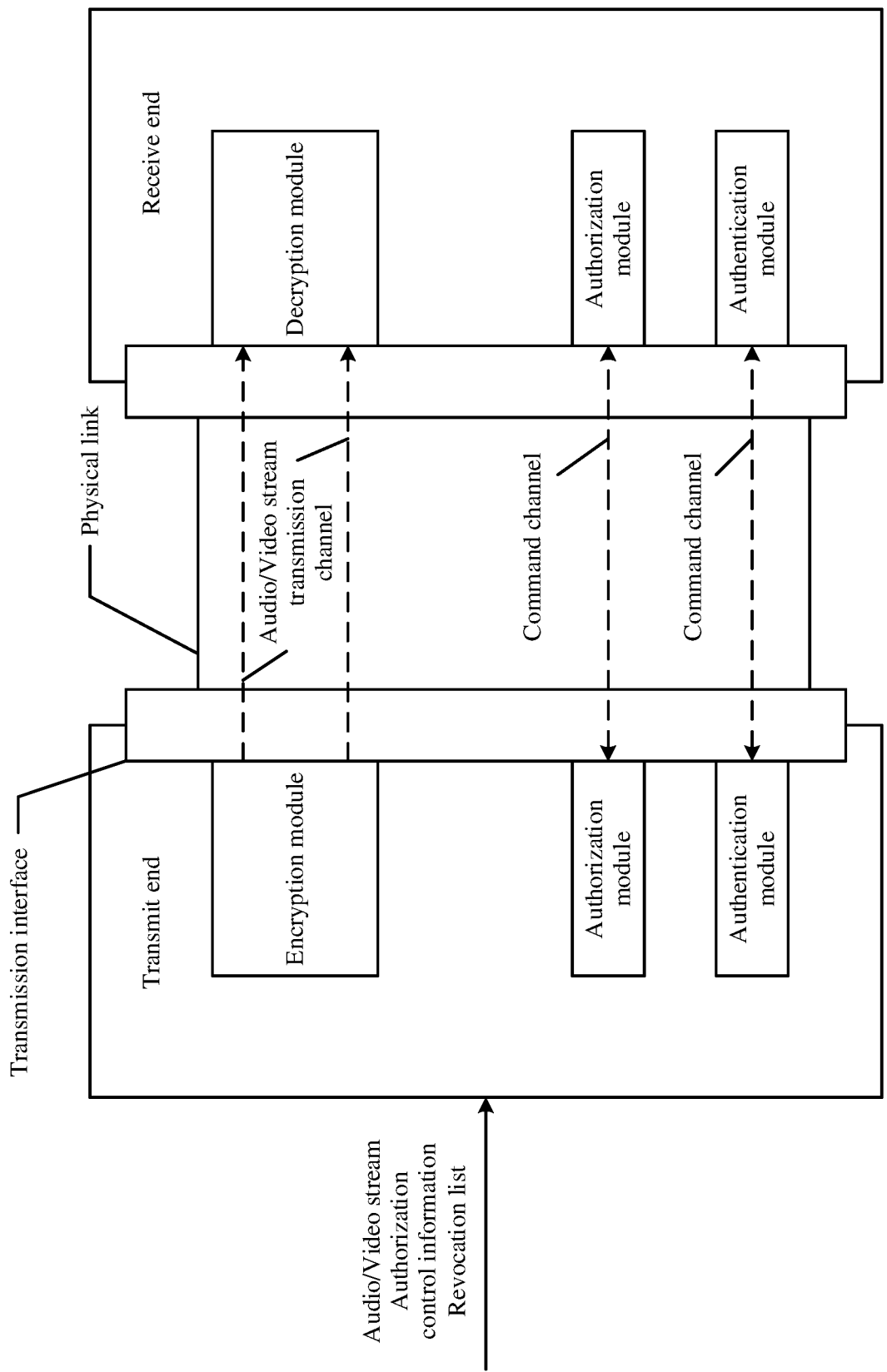
FIG. 3 is an example schematic diagram of device connection according to an embodiment of this application.

As shown in FIG. 3 (FIG. 3 is a schematic diagram of device connection according to an embodiment of this application), a command channel and an audio/video stream transmission channel may be established between a transmit end and a receive end. The command channel is used for protocol interaction between the transmit end and the receive end. To be specific, the command channel is used to implement identity authentication, key agreement, and authorization control. Generally, there are a plurality of command channels between the transmit end and the receive end. For example, a command channel may be formed between the authentication module of the transmit end and the authentication module of the receive end. The command channel is used for identity authentication, key agreement, revocation list update, and the like. A command channel may be formed between the authorization module of the transmit end and the authorization module of the receive end. The command channel is used to send authorization information of different audio/video streams. The audio/video stream transmission channel is used for audio/video stream transmission between the transmit end and the receive end. Audio/video stream transmission channels cascaded between devices of a plurality of levels may form an entire audio/video stream transmission path. Generally, there are a plurality of audio/video stream transmission channels between the encryption module of the transmit end and the decryption module of the receive end. One audio/video stream transmission channel may be used to transmit one audio/video stream, and different audio/video stream transmission channels are used to transmit different audio/video streams.

The command channel and the audio/video stream transmission channel are both logical channels and provided by transmission interfaces of the device. A physical transmission link formed by the transmission interfaces may be reused. It should be noted that the transmission interface may invoke the encryption module of the transmit end to encrypt the audio/video stream transmitted in the physical link, and the transmission interface may further invoke the decryption module of the receive end to decrypt the transmitted audio/video stream.

Along the entire audio/video stream transmission path, a level-1 device may initiate authentication and authorization to a lower-level device, and the subsequent devices of all levels also initiate authentication and authorization to the lower-level device. Therefore, a trust chain of the entire audio/video stream transmission path is established, to implement secure transmission of the audio/video stream. If the transmit end fails to authenticate the receive end or authorize the receive end, the transmit end stops sending the audio/video stream to the receive end.

Figure 4:
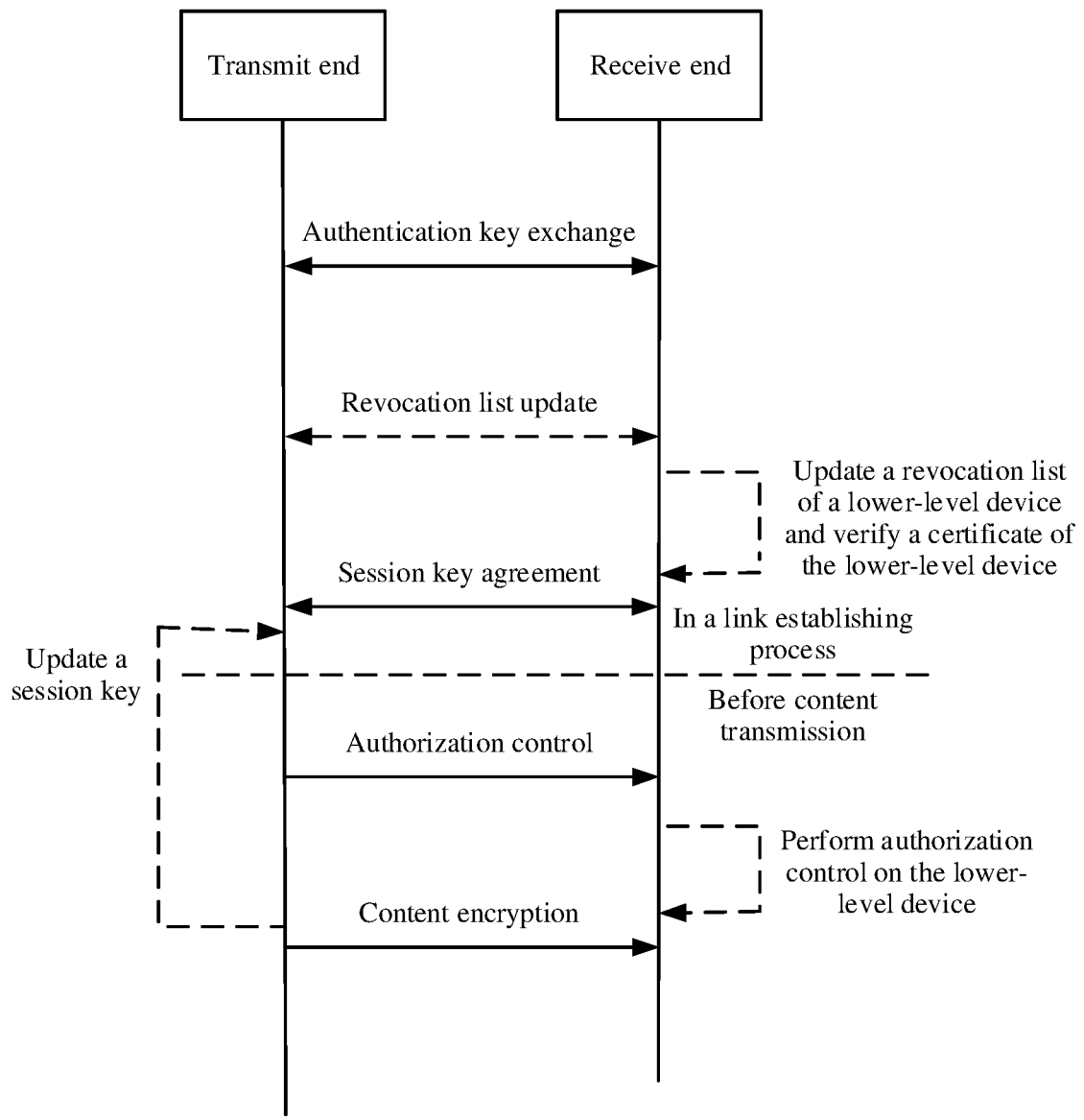
FIG. 4 is an example schematic diagram of an HTCP working process according to an embodiment of this application.

To understand a complete HTCP working process, the following preliminarily describes an HTCP working process with reference to FIG. 4. FIG. 4 is a schematic diagram of the HTCP working process according to an embodiment of this application. As shown in FIG. 4, the HTCP working process includes: identity authentication, key agreement, revocation list update, authorization control, content encryption, and the like. The processes of identity authentication, key agreement, and revocation list update are completed during link establishment between devices. The processes of authorization control and content encryption are completed before audio/video stream transmission. For example, after a transmission interface of a transmit end is connected to a transmission interface of a receive end, the transmit end and the receive end need to confirm information (for example, a transmission interface parameter and a device parameter) of each other. In this case, the transmit end and the receive end send their own information to each other and confirm the information sent by each other. This process is equivalent to that the transmit end and the receive end are in a process of establishing a transmission link. In the process of establishing the transmission link, the transmit end and receive end can complete identity authentication, key agreement, and revocation list update. After both the transmit end and the receive end determine that the information of each other is correct, the transmit end and the receive end may stop information confirmation, which is equivalent to that establishment of the transmission link is completed. After the transmission link is established, the transmit end and the receive end may perform operations such as authorization control and content encryption. The following briefly describes each process as follows:

(1) Identity authentication and key agreement: This process includes an authentication key exchange (AKE) process and a session key agreement (SKA) process. During device connection establishment (that is, during establishment of the transmission link between the devices), the authentication key exchange process is used to implement authentication and authentication key exchange between connected devices. The session key agreement process is used to agree on a session key for encrypting an audio/video stream. This process is initiated by the transmit end and responded to by the receive end.

(2) Revocation list update: After the authentication key exchange process succeeds, the transmit end checks whether a locally stored revocation list is updated compared with a revocation list of a lower-level device. If yes, the transmit end needs to send a revocation list update message to the lower-level device to update the revocation list of the lower-level device. A content authorization system may invoke a revocation list update interface of a transmitter to update the revocation list. After receiving a new revocation list from the transmit end, the receive end needs to use the new revocation list to verify a certificate of the lower-level device.

(3) Authorization control: After establishment of the transmission link between the devices is completed, authorization between the devices is controlled based on the transmitted audio/video stream. An audio/video stream channel is bound to a unique audio/video stream. Each audio/video stream is transmitted through a corresponding audio/video stream channel. An audio/video stream transmission channel has a unique channel identifier (streamChannelId). Before audio/video stream transmission, the content authorization system invokes an authorization interface of the transmitter to send authorization information. The transmitter receives the authorization information from the content authorization system through the authorization interface, performs authorization control on the lower-level device based on the authorization information, and sends the authorization information to the lower-level device. During audio/video stream transmission, before content encryption, the transmit end determines a current authentication and authorization status of the receive end after receiving the authorization information. If both authentication and authorization succeed, the transmit end encrypts an audio/video stream and sends the audio/video stream to the lower-level device. If authorization fails, the transmit end stops encrypting the stream and sending the stream to the lower-level device. The receive end performs authorization control on local content based on the authorization information.

(4) Content encryption: During audio/video stream transmission, the transmit end encrypts the transmitted audio/video stream by using the agreed session key, and the receive end decrypts the transmitted audio/video stream by using the agreed session key. During encryption, the session key may be updated by using the session key agreement process. In an HTCP system, when different device groups (each device group includes a transmit end and a receive end) perform the foregoing working process, the device groups are independent of each other, and are used for asynchronous operations, to ensure interaction performance.

To further understand the foregoing HTCP working process, the following provides descriptions with reference to each process of HTCP. The following first describes related terms mentioned below:

Key management: defines requirements for an HTCP trust system, a key system, and secure storage.

(1) Trust System

An HTCP trust system is built based on a public key infrastructure (PKI) certificate system. A device in the system is equipped with a built-in HTCP device certificate and trust chain. The device is authenticated based on a certificate chain of the device.

(1.1) Certificate System

An HTCP PKI includes an HTCP root CA (Root CA) and an HTCP device CA (Device CA).

The HTCP root CA generates a public-private key pair of the root CA and self-signs a public key of the root CA to generate a root CA certificate. The root CA manages the HTCP device CA and signs the public key of the device CA to generate a device CA certificate.

The HTCP device CA generates a public-private key pair of the device CA and submits a public key to the HTCP root CA to apply for a signature to obtain a device CA certificate. The HTCP device CA generates a public-private key pair of a device and signs the public key to generate a device certificate.

A certificate format complies with the X.509 v3 standard, supports the sm3SM2 Chinese cryptographic encryption algorithm, and optionally supports the sha256X25519 international algorithm. For details about the certificate format, refer to Appendix B: certificate format, including HTCP root CA certificate, device CA certificate, and device certificate formats. The device CA certificate carries information such as a device type (for a receiver, a repeater, and a transmitter, a device certificate is not needed), a security level, and a version.

Before a device is delivered, the transmitter places an HTCP Chinese cryptographic algorithm and an international algorithm root CA certificate in a secure storage. The receiver places the device CA certificate, the private key of the device, and the corresponding device certificate in the secure storage; and the repeater places the HTCP Chinese cryptographic algorithm, the international algorithm root CA certificate, the device CA certificate, the private key of the device, and the corresponding device certificate in the secure storage.

During identity authentication and key agreement, the receive end sends the device CA certificate and the device certificate to an authenticator. An authentication device uses the built-in HTCP root CA certificate to verify a certificate of an authenticated device based on the certificate chain.

(1.2) Revocation List

In the authentication key exchange process, the authentication device uses a revocation list to detect whether the authenticated device is revoked. The revocation list complies with the X.509v2 CRL standard. For the format, refer to Appendix C: revocation list format. A latest revocation list needs to be added to the device before delivery.

(1.3) Global Authentication Constant

A global authentication constant is used to derive an hmac key (hmacKey) used for protocol interaction and an encryption key (encKey) used for session key agreement, and has a value of 0x85AC702793BD614F.

(2) Key System

A three-level key system is used for HTCP, including:

Public-private key pair of a device: A transmit end encrypts an authentication key by using a public key of the device. A receive end decrypts the authentication key by using a private key of the device. An algorithm is determined by whether the Chinese cryptographic algorithm or the international algorithm is used by a device certificate of the receive end. The SM2 encryption algorithm is used as the Chinese cryptographic algorithm. The curve25519 encryption algorithm is used as the international algorithm.

Authentication key: The transmit end and the receive end agree on a session key by using the authentication key. The session key encryption method SessionKeyEncrypt and the HMAC algorithm are determined by whether the Chinese cryptographic algorithm or the international algorithm is used by the device certificate of the receive end. The SM4-CTR algorithm is used as the cryptographic encryption algorithm. The AES-128-CTR algorithm is used as the international encryption algorithm. The HMAC-SM3 is used as the Chinese cryptographic HMAC algorithm. The HMAC-SHA256 is as the international HMAC algorithm.

Session key: The transmit end uses the session key to encrypt content. The receive end uses the session key to decrypt the content. The SM4 algorithm is used as the Chinese cryptographic encryption algorithm. The AES-128 algorithm is used as the international encryption algorithm in a CTR or GCM mode.

(3) Secure Storage (3.1) Data Storage

A private key of the device should be stored in a secure storage and cannot be modified or replaced. In addition, the private key cannot be read by other software or hardware except an HTCP system.

A device certificate and a device CA certificate should be stored in the secure storage and cannot be modified or replaced.

A root CA certificate may be hardcoded or stored in the secure storage and cannot be modified or replaced.

A revocation list may be stored in the secure storage or an external non-volatile storage. If the revocation list is stored in the external non-volatile storage, an integrity check value for the revocation list needs to be stored in the secure storage, and the integrity check value in the secure storage needs to be updated after update. When the revocation list is read, the integrity check value needs to be used to verify data of the revocation list.

(3.2) Storage Space

A secure storage space of the device may store a private key of the device, the device certificate, a device CA certificate, a root CA certificate, the revocation list, or the integrity check value for the revocation list, and has a minimum size of 20 KB.

(3.3) Secure Storage Requirements

For secure storage requirements, refer to a security level shown in Table 8.

In addition, formats of the certificates and the revocation list are provided for description below, as shown in Table 1 to Table 4.

TABLE 1

Format of an HTCP root certificate

| Field | Description |
|---|---|
| Version | Version number |
| Serial Number | Certificate ID |
| Signature Algorithm | Signature algorithm |
| Issuer | Issuer |
| Validity | Validity |
| Subject | Subject, including the following attributes: country/region name (country Name), organization name (oranizationName), and common name (commonName): "HTCP Root CA". |
| Subject Public Key Info | Public key information of a subject, including: algorithm identifier id-ecPublicKey ID, curve identifier OID, and public key. |
| IssuerUniqueID | Unique identifier of the issuer, which is not used. |
| SubjectUniqueID | Unique identifier of the subject, which is not used. |
| Extension | Extension, including: basic constraint extension (Basic Constraints): a CA field is set to be true; and key usage extension (Key Usage): only key usage bits KeyCertSign and CRLSign are set. |
| Signature | Signature value |

TABLE 2

Format of an HTCP device CA certificate

| Field | Description |
|---|---|
| Version | Version number |
| Serial Number | Certificate ID |
| Signature Algorithm | Signature algorithm |
| Issuer | Issuer |
| Validity | Validity |
| Subject | Subject, including the following attributes: country/region name (country Name), organization name (oranizationName), and common name (commonName): "HTCP Device CA". |
| Subject Public Key Info | Public key information of a subject, including: algorithm identifier id-ecPublicKey ID, curve identifier OID, and public key. |
| IssuerUniqueID | Unique identifier of the issuer, which is not used. |
| SubjectUniqueID | Unique identifier of the subject, which is not used. |
| Extension | Extension, including: basic constraint extension (Basic Constraints): a CA field is set to be true; and key usage extension (Key Usage): only key usage bits KeyCertSign and CRLSign are set. |
| Signature | Signature value |

TABLE 3

Format of an HTCP device certificate

| Field | Description |
|---|---|
| Version | Version number |
| Serial Number | Certificate ID |
| Signature Algorithm | Signature algorithm |
| Issuer | Issuer |
| Validity | Validity |
| Subject | Subject, including the following attributes: country/region name (country Name), organization name (oranizationName), and common name (commonName), including a character string and five parts: (1) device type: RP is a repeater, and RX is a receiver; (2) security level: Lx, where x indicates a security level; (3) protocol version: 4 characters, hexadecimal character of the protocol version, where a current version is "0001"; (4) vendor ID: four characters, for example, "0001"; and (5) device ID: 12 hexadecimal characters, for example, "112233445566". |
| Subject Public Key Info | Public key information of the subject, including: algorithm identifier id-ecPublicKey ID, curve identifier OID, and public key. |
| IssuerUniqueID | Unique identifier of the issuer, which is not used. |
| SubjectUniqueID | Unique identifier of the subject, which is not used. |
| Extension | Extension, including: basic constraint extension (Basic Constraints), which is not used; and key usage extension (Key Usage): only key usage bits digital Signature and keyEncipherment are set. |
| Signature | Signature value |

TABLE 4

Format of a revocation list

```
CertificateList  :: =  SEQUENCE {
   tbsCertList            TBSCertList,
   SignatureAlgorithm     AlgorithmIdentifiter,
   signatureValue         BIT STRING
}
TBSCertList   :: = SEQUENCE {
   version               version
   signature             AlgorithmIdentifiter,
   issuer                Name,
   thisUpdate            Time,
   revokedCertificates   SEQUENCE OF SEQUENCE {
      userCertificate        CertificateSerialNumber,
      revocationDate         Time
   }
   crlExtensions         OPTIONAL
}
```

Further, the following provides supplementary descriptions of key derivation:

The PDKDF2 algorithm is as a key derivation algorithm. A formula is derivedKey=PDKDF2 (HASH algorithm, password, salt, count, keyLen).

(1) The HASH algorithm is determined by a signature algorithm of the device certificate of the receive end. If the signature algorithm is a Chinese cryptographic algorithm, SM3 is used. If the signature algorithm is an international algorithm, SHA256 is used.

(2) password: indicates a derivation parameter.

(3) salt: indicates a salt value.

(4) count: indicates a number of iterations.

(5) keyLen: indicates a length of a derived key.

hmacKey is the HMAC key used for protocol interaction. A derivation method is hmacKey=PDKDF2 (HASH algorithm, authKey||global authentication constant||"mac key", sessionId, 1, 16).

encKey is the encryption key used in the session key agreement process. A derivation method is encKey=PDKDF2 (HASH algorithm, authKey||global authentication constant||"enc key", sessionId, 1, 16).

Figure 5:
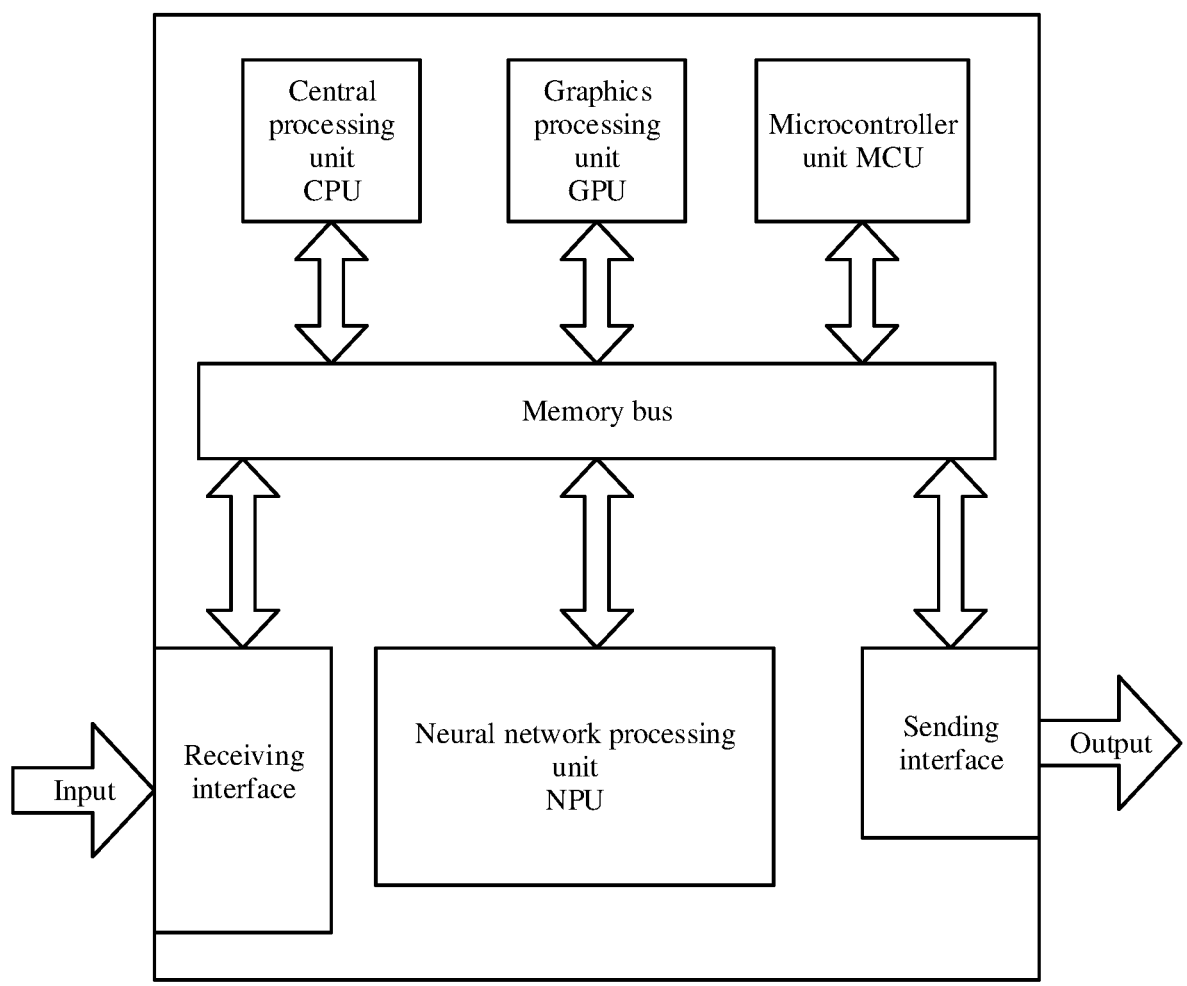
FIG. 5 is an example diagram of a hardware architecture of a content transmission protection apparatus according to an embodiment of this application.

FIG. 5 is a diagram of a hardware architecture of a content transmission protection apparatus according to an embodiment of this application. The content transmission protection apparatus 500 may be, for example, a processor chip. For example, the hardware architecture shown in FIG. 5 may be an example architecture of a processor of the transmitter, the repeater, or the receiver in FIG. 1. A content transmission protection method provided in embodiments of this application may be applied to the processor chip.

Refer to FIG. 5, the apparatus 500 includes at least one CPU, a memory, a microcontroller unit (MCU), a graphics processing unit (GPU), a neural network processing unit (NPU), a memory bus, a receiving interface, a sending interface, and the like. Although not shown in FIG. 5, the apparatus 500 may further include an application processor (Application Processor, AP), a decoder, and a dedicated video/image processor.

The foregoing parts of the apparatus 500 are coupled by using connectors. For example, the connectors include various interfaces, transmission lines, buses, or the like. These interfaces are usually electrical communication interfaces, but may alternatively be mechanical interfaces or interfaces in another form. This is not limited in this embodiment.

Optionally, the CPU may be a single-core processor (e.g., single-CPU) or a multi-core processor (e.g., multi-CPU). Optionally, the CPU may be a processor group including a plurality of processors, and the plurality of processors are coupled to each other by using one or more buses. The receiving interface may be a data input interface of the processor chip. In an optional case, the receiving interface and the sending interface may be a high-definition multimedia interface (HDMI), a V-By-One interface, an embedded display port (eDP), a mobile industry processor interface (MIPI), a display port (DP), or the like.

In an optional case, the foregoing parts are integrated into a same chip. In another optional case, the CPU, the GPU, the decoder, the receiving interface, and the sending interface are integrated into a chip, and each part in the chip accesses an external memory by using a bus. The dedicated video/graphics processing unit may be integrated with the CPU on a same chip, or may exist as a separate processor chip. For example, the dedicated video/graphics processing unit may be a dedicated ISP. In an optional case, the NPU may alternatively be used as an independent processor chip. The NPU is configured to implement related operations of various neural networks or deep learning. Optionally, an image processing method and an image processing framework provided in embodiments of this application may be implemented by the GPU or the NPU, or may be implemented by a dedicated graphics processing unit.

The chip in embodiments of this application is a system manufactured on a same semiconductor substrate by using an integrated circuit technology, and is also referred to as a semiconductor chip. The chip may be a set of integrated circuits formed on the substrate (which is usually a semiconductor material such as silicon) by using the integrated circuit technology, and an outer layer of the chip is usually packaged with a semiconductor packaging material. The integrated circuit may include various functional devices. Each type of functional device includes a transistor such as a logic gate circuit, a metal oxide semiconductor (MOS) transistor, a bipolar transistor, or a diode, or the integrated circuit may include another device such as a capacitor, a resistor, or an inductor. Each functional device may independently operate or operate under action of necessary driver software, and may implement various functions such as communication, operation, or storage.

Figure 6A:
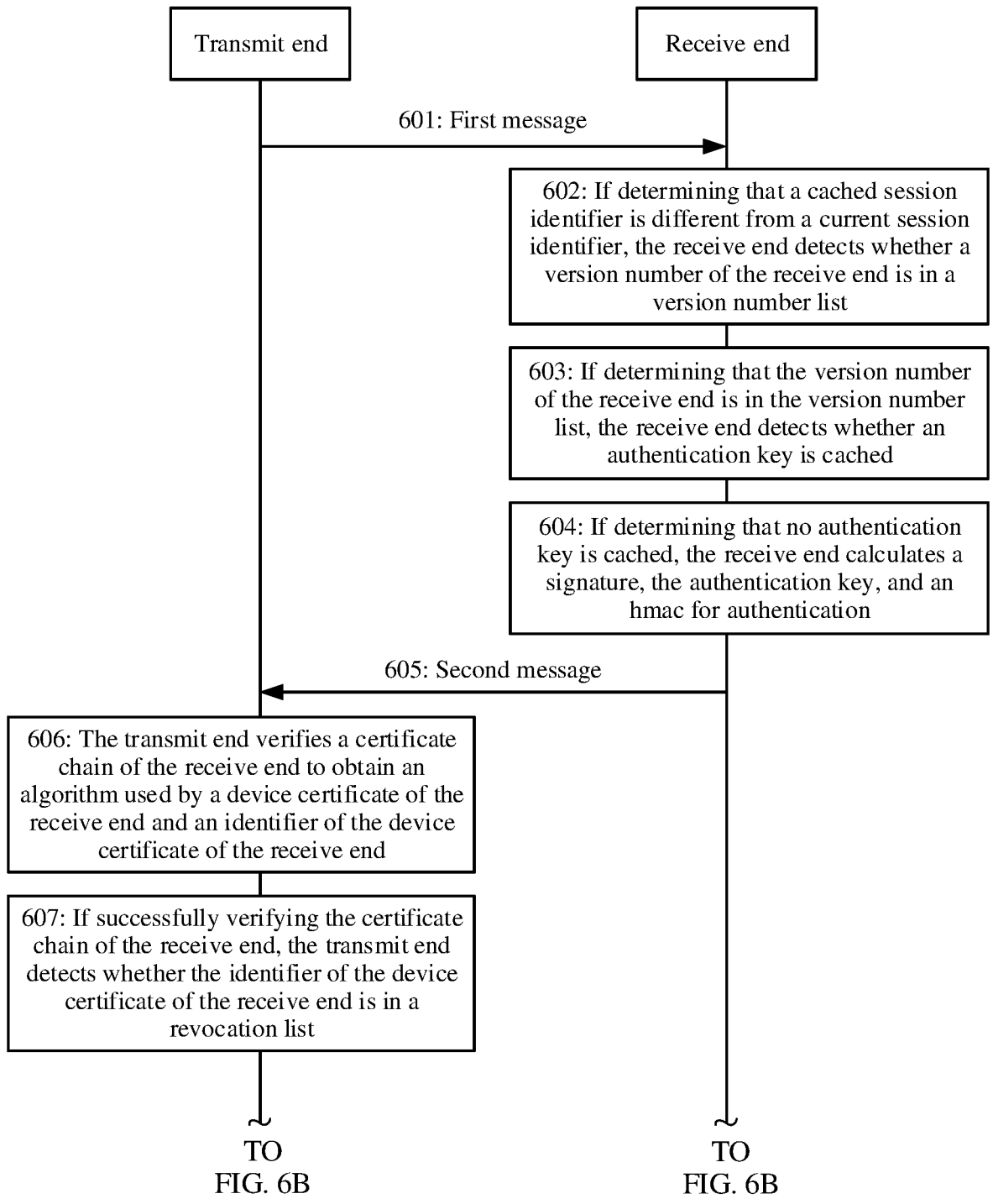
FIG. 6A and FIG. 6B are example schematic flowcharts of a content transmission protection method according to an embodiment of this application.
Figure 6B:
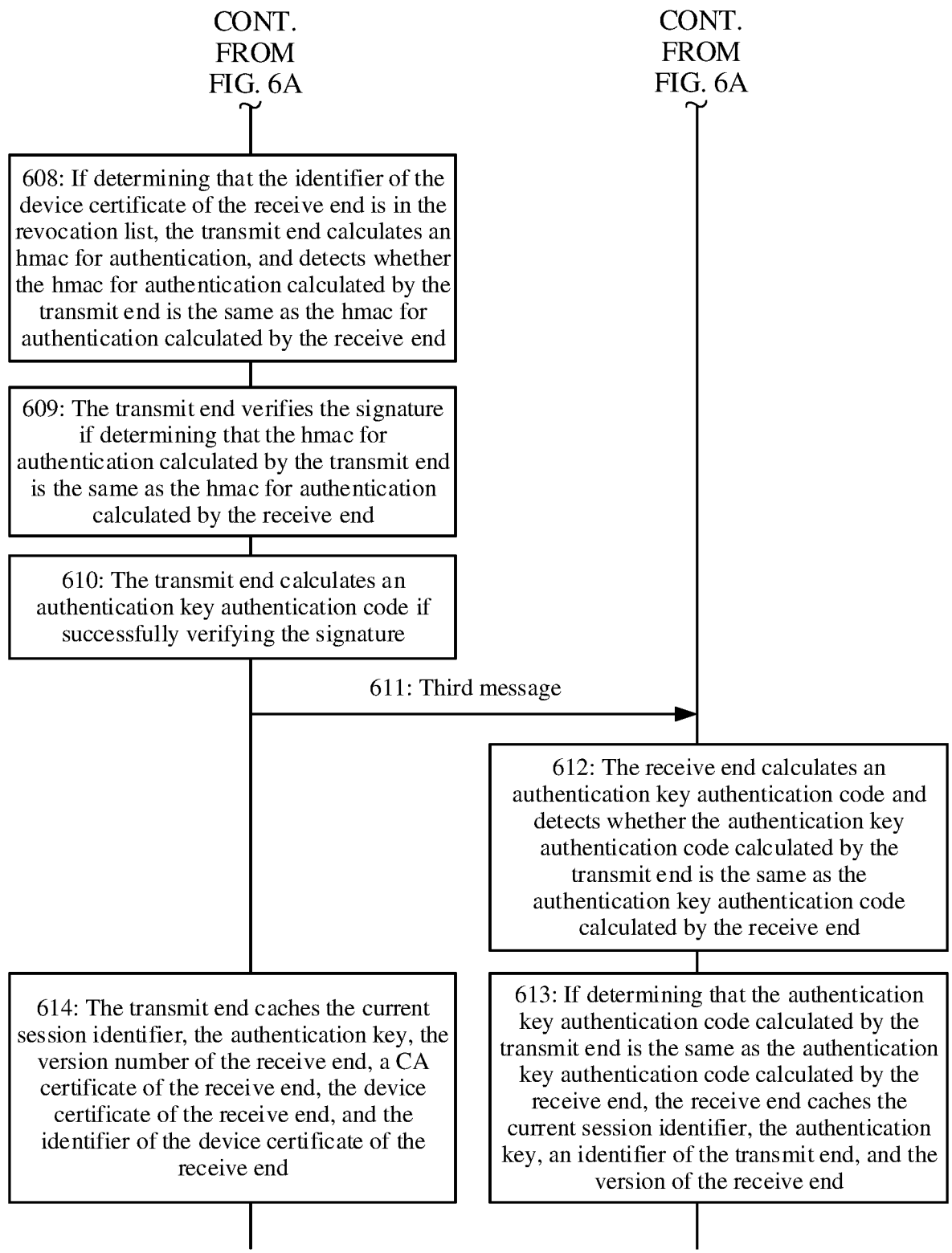

For ease of further understanding, the following separately describes all process. FIG. 6A and FIG. 6B are a schematic flowchart of a content transmission protection method according to an embodiment of this application. It should be noted that the foregoing authentication key exchange process includes a common authentication process and a fast authentication process. The method shown in FIG. 6A and FIG. 6B is the common authentication process. As shown in FIG. 6A and FIG. 6B, the method includes the following steps.

601: The transmit end sends a first message to a receive end. The first message includes a current session identifier, a transmit end identifier, a version number list, a public key list, and a fast authentication identifier.

When needing to initiate authentication to the receive end, the transmit end may first generate two random numbers: a private key (x) of the transmit end and the current session identifier (sessionId). The identifier indicates a current session between the transmit end and the receive end.

Then, the transmit end may obtain the transmit end identifier (txId), the version number list (supportedVersions), the public key list (xG0||xG1), and the fast authentication identifier (enableFastAuth). The transmit end identifier indicates an identity of the transmit end. The version number list includes at least one version number of an HCTP protocol supported by the transmit end. The public key list includes two public keys in an elliptic curve key exchange protocol (elliptic curve diffie-hellman, ECDH): a public key (xG0) calculated by the transmit end according to a Chinese cryptographic algorithm and a public key (xG1) calculated by the transmit end according to an international algorithm. An initial value of the fast authentication identifier is 1. The receive end may determine, based on the fast authentication identifier, whether to perform the common authentication process or the fast authentication process. Specifically, when determining that the fast authentication identifier is 1, the receive end may attempt to perform the fast authentication process (to be specific, determine whether an authentication key is cached). If the receive end fails to perform the fast authentication process, the transmit end sets the fast authentication identifier to 0. If the receive end successfully performs the common authentication process or the fast authentication process, the transmit end sets the fast authentication identifier to 1. When determining that the fast authentication identifier is 0, the receive end directly performs the common authentication process.

Then, the transmit end generates the first message (AKE_AUTHKEY_EXCHANGE) based on the current session identifier, the transmit end identifier, the version number list, the public key list, and the fast authentication identifier. The following describes each field of the first message with reference to Table 5, as shown in Table 5.

TABLE 5

AKE_AUTHKEY_EXCHANGE

| Field | Length, in bytes (bytes) | Description |
| --- | --- | --- |
| msgId | 2 | ID of a first message, with a value of 0x01 |
| sessionId | 8 | Current session identifier |
| txId | 8 | Transmit end identifier |
| supportedVersionsNumbers | 1 | Number of protocol versions supported by a transmit end |
| supportedVersions | 2 * supportVersionNumbers | List of versions supported by the transmit end. Each version number includes two bytes. |
| xG0∥xG1 | 32 + 32 | Public key of the transmit end in an ECDH |
| enableFastAuth | 1 | Fast authentication identifier. When a value is 0x1, it indicates that a fast authentication process is started. When the value is 0x0, it indicates that the fast authentication process is forbidden. |

After obtaining the first message, the transmit end sends the first message to the receive end.

602: If determining that a cached session identifier is different from the current session identifier, the receive end detects whether a version number of the receive end is in the version number list.

After receiving the first message, the receive end may parse the first message to obtain each parameter in the first message, and then determine the parameter. Specifically, if determining that the session identifier is locally cached, the receive end obtains the locally cached session identifier, determines whether the cached session identifier is the same as the session identifier (namely, the current session identifier) sent by the transmit end. If the cached session identifier is different from the session identifier, the receive end detects whether the version number of the receive end is in the version number list. If the cached session identifier is the same as the session identifier, the receive end sends an error message to the transmit end, to notify the transmit end of a session identifier error, and stops the authentication process. If determining that the session identifier is not locally cached, the receive end detects whether the version number of the receive end is in the version number list.

603: If determining that the version number of the receive end is in the version number list, the receive end detects whether the authentication key is cached.

When detecting whether the version number supported by the receive end is in the version number list, the receive end may first obtain a latest version number that can be supported by the receive end, and then determine whether the latest version number is in the version number list.

If it is determined that the version number of the receive end is in the version number list, because the fast authentication identifier is set to 1, the receive end detects whether the authentication key is locally cached; and if the authentication key is locally cached, the fast authentication process is started, or if the authentication key is not locally cached, a next step is performed.

If it is determined that the version number of the receive end is not in the version number list, the receive end sends the error message to the transmit end, to notify the transmit end that the version number is not supported, and stops the authentication process.

604: If determining that no authentication key is cached, the receive end calculates a signature, the authentication key, and an hmac for authentication.

After determining that no authentication key is cached, the receive end generates a random number as a private key (y) of the receive end, and generates a public key (yG) of the receive end according to an algorithm supported by the receive end. In addition, the receive end may further select one of two public keys of the transmit end in the first message as a public key (xG) of the transmit end (finally determined).

Then, the receive end may calculate the signature (signAuth=S (yG∥xG∥txId∥version∥sessionId∥crlThisUpdate, rxPriKey)) based on the public key (yG) of the receive end, the finally determined public key (xG) of the transmit end, the transmit end identifier (txId), the version number (version) of the receive end, the current session identifier (sessionId), an update time (crlThisUpdate) of a revocation list of the receive end, and a private key (rxPriKey) corresponding to a device certificate of the receive end. It should be noted that when the receive end supports a plurality of version numbers, one of the version numbers may be selected as the version number (finally determined) of the receive end.

Further, the receive end may further calculate the authentication key (authKey=y(xG)) based on the private key of the receive end and the finally determined public key of the transmit end.

Further, the receive end may further calculate the hash-based message authentication code for authentication (hash-based message authentication code, hmac) (hmacAuth=HAMC (yG∥xG∥txId∥version∥sessionId∥crlThisUpdate, authKey)) based on the public key (yG) of the receive end, the finally determined public key (xG) of the transmit end, the transmit end identifier (txId), the version number (version) of the receive end, the current session identifier (sessionId), the update time (crlThisUpdate) of the revocation list, and the authentication key (authKey) calculated by the receive end.

605: The receive end sends a second message to the transmit end. The second message includes the current session identifier, the version number of the receive end, a device certificate authority (certificate authority, CA) certificate of the receive end, a device certificate of the receive end, the update time of the revocation list, the public key of the receive end, the signature, and the hmac for authentication calculated by the receive end.

After obtaining the signature, the authentication key, and the hmac for authentication, the receive end may generate the second message (AKE_AUTHKEY_EXCHANGE_ACK) based on the current session identifier, the version number of the receive end, the device CA certificate (caCert) of the receive end, the device certificate (rxCert) of the receive end, the update time (crlThisUpdate) of the revocation list, the public key of the receive end, the signature, and the hmac for authentication. The following describes each field of the second message with reference to Table 6, as shown in Table 6.

TABLE 6

AKE_AUTHKEY_EXCHANGE_ACK

| Field | Length, in bytes (bytes) | Description |
|---|---|---|
| msgId | 2 | ID of a second message, with a value of 0x03 |
| sessionId | 8 | Current session identifier |
| Version | 2 | Version number supported by a receive end |
| caCertLen | 4 | Length of a device CA certificate of the receive end |
| caCert | caCertLen | Device CA certificate of the receive end |
| crlThisUpdate | 8 | Update time of a revocation list, seconds from 00:00:00 on Jan. 1, 1970 to this time point |
| rxCertLen | 4 | Length of a device certificate of the receive end |
| rxCert | rcCertLen | Device certificate of the receive end |
| yG | 32 | Public key of the receive end in an ECDH |
| signAuth | 64 | Signature |
| hmacAuthLen | 2 | Length of hmacAuth |
| hmacAuth | hmacAuthLen | hmac for authentication calculated by the receive end. If an authentication key authKey has been cached, this field is set to hmacAuth. |

After obtaining the second message, the receive end sends the second message to the transmit end.

606: The transmit end verifies a certificate chain of the receive end to obtain an algorithm used by the device certificate of the receive end and an identifier of the device certificate of the receive end.

After receiving the second message, the transmit end may first check a session identifier in the second message. If the session identifier is inconsistent with the session identifier previously sent by the transmit end, the transmit end records an authentication status as a session identifier error, and stops the authentication process. If the session identifier is consistent with the session identifier previously sent by the transmit end, the transmit end determines whether the version number of the receive end in the second message is supported.

If the transmit end does not support the version number of the receive end, the transmit end records the authentication status as a protocol version number error and stops the authentication process. If the transmit end supports the version number of the receive end, the transmit end verifies the certificate chain of the receive end based on the device CA certificate and the device certificate of the receive end to obtain the algorithm (an international algorithm or a Chinese cryptographic algorithm, which can be used for follow-up content encryption) used by the device certificate of the receive end and the identifier (Serial Number) of the device certificate of the receive end.

Specifically, a process in which the transmit end verifies the certificate chain of the receive end is as follows: After the receive end sends the device CA certificate and the device certificate to the transmit end, the transmit end verifies, based on the certificate chain, the device CA certificate and the device certificate of the receive end by using a built-in HTCP root CA certificate.

607: If successfully verifying the certificate chain of the receive end, the transmit end detects whether the identifier of the device certificate of the receive end is in the revocation list.

If successfully verifying the certificate chain of the receive end, the transmit end detects whether the identifier of the device certificate of the receive end is in the revocation list. If failing to verify the certificate chain of the receive end, the transmit end records the authentication status as a certificate verification failure, and stops the authentication process.

608: If determining that the identifier of the device certificate of the receive end is in the revocation list, the transmit end calculates an hmac for authentication, and detects whether the hmac for authentication calculated by the transmit end is the same as the hmac for authentication calculated by the receive end.

If determining that the identifier of the device certificate of the receive end is in the revocation list, the transmit end calculates an authentication key (authKey=x(yG)) based on the private key (x) of the transmit end and the public key (yG) of the receive end, calculates the hmac for authentication based on the public key (yG) of the receive end, the finally determined public key (xG) of the transmit end, the transmit end identifier (txId), the version number (version) of the receive end, the current session identifier (sessionId), the update time (crlThisUpdate) of the revocation list, and the authentication key (authKey) calculated by the transmit end, and then detects whether the hmac for authentication calculated by the transmit end is the same as the hmac for authentication calculated by the receive end.

If determining that the identifier of the device certificate of the receive end is not in the revocation list, the transmit end records the authentication status as certificate revocation and stops the authentication process.

609: The transmit end verifies the signature if determining that the hmac for authentication calculated by the transmit end is the same as the hmac for authentication calculated by the receive end.

If determining that the hmac for authentication calculated by the transmit end is the same as the hmac for authentication calculated by the receive end, the transmit end verifies the signature (signAuth) by using the public key (rxPubKey) corresponding to the device certificate of the receive end. It should be noted that, after parsing the second message to obtain the device certificate of the receive end, the transmit end may obtain the public key corresponding to the device certificate of the receive end.

If determining that the hmac for authentication calculated by the transmit end is not the same as the hmac for authentication calculated by the receive end, the transmit end records the authentication status as an HAMC verification failure, and stops the authentication process.

610: The transmit end calculates an authentication key authentication code if successfully verifying the signature.

If the transmit end successfully verifies the signature, the transmit end calculates the authentication key authentication code (hmacAuthConfirm=HMAC (txId||version||sessionId, authKey)) based on the transmit end identifier (txId), the version number (version) of the receive end, the current session identifier (sessionId), and the authentication key (authKey) calculated by the transmit end.

If failing to verify the signature, the transmit end records the authentication status as a signature verification failure, and stops the authentication process.

611: The transmit end sends a third message to the receive end. The third message includes the current session identifier and the authentication key authentication code calculated by the transmit end.

After obtaining the authentication key authentication code, the transmit end generates the third message (AKE_AUTHKEY_CONFIRM) based on the current session identifier and the authentication key authentication code. The following describes each field of the third message with reference to Table 7, as shown in Table 7:

TABLE 7

AKE_AUTHKEY_CONFIRM

| Field | Length, in bytes (bytes) | Description |
|---|---|---|
| msgId | 2 | ID of a third message, with a value of 0x04 |
| sessionId | 8 | Current session identifier |
| hmacAuthConfirmLen | 2 | Length of an authentication key authentication code |
| hmacAuthConfirm | hmacAuthConfirmLen | Authentication key authentication code |

Then, the transmit end sends the third message to the receive end.

612: The receive end calculates an authentication key authentication code and detects whether the authentication key authentication code calculated by the transmit end is the same as the authentication key authentication code calculated by the receive end.

After receiving the third message, the receive end checks a session identifier in the third message, and then calculates the authentication key authentication code (hmacAuthConfirm=HMAC (txId∥version∥sessionId, authKey)) based on the transmit end identifier (txId), the version number (version) of the receive end, the current session identifier (sessionId), and the authentication key (authKey) calculated by the receive end. Then, the receive end detects whether the authentication key authentication code calculated by the transmit end is the same as the authentication key authentication code calculated by the receive end.

613: If determining that the authentication key authentication code calculated by the transmit end is the same as the authentication key authentication code calculated by the receive end, the receive end caches the current session identifier, the authentication key, the transmit end identifier, and the version of the receive end.

If determining that the authentication key authentication code calculated by the transmit end is the same as the authentication key authentication code calculated by the receive end, the receive end caches the current session identifier, the authentication key calculated by the receive end, the transmit end identifier, and the version of the receive end. In addition, the receive end may further send a fourth message to the transmit end, to notify the transmit end that the authentication key is successfully verified.

If determining that the authentication key authentication code calculated by the transmit end is not the same as the authentication key authentication code calculated by the receive end, the receive end sends an error message to the transmit end to notify the transmit end that verification of the authentication key fails, and stops the authentication process.

614: The transmit end caches the current session identifier, the authentication key, the version number of the receive end, the CA certificate of the receive end, the device certificate of the receive end, and the identifier of the device certificate of the receive end.

After receiving the fourth message, the transmit end may set an authentication status of the receive end to be successful, and cache the current session identifier, the authentication key, the version of the receive end, the CA certificate of the receive end, the device certificate of the receive end, and the identifier of the device certificate of the receive end. Alternatively, the transmit end may directly cache (to be specific, the received fourth message is not needed) the current session identifier, the authentication key, the version of the receive end, the CA certificate of the receive end, the device certificate of the receive end, and the identifier of the device certificate of the receive end.

Figure 7:
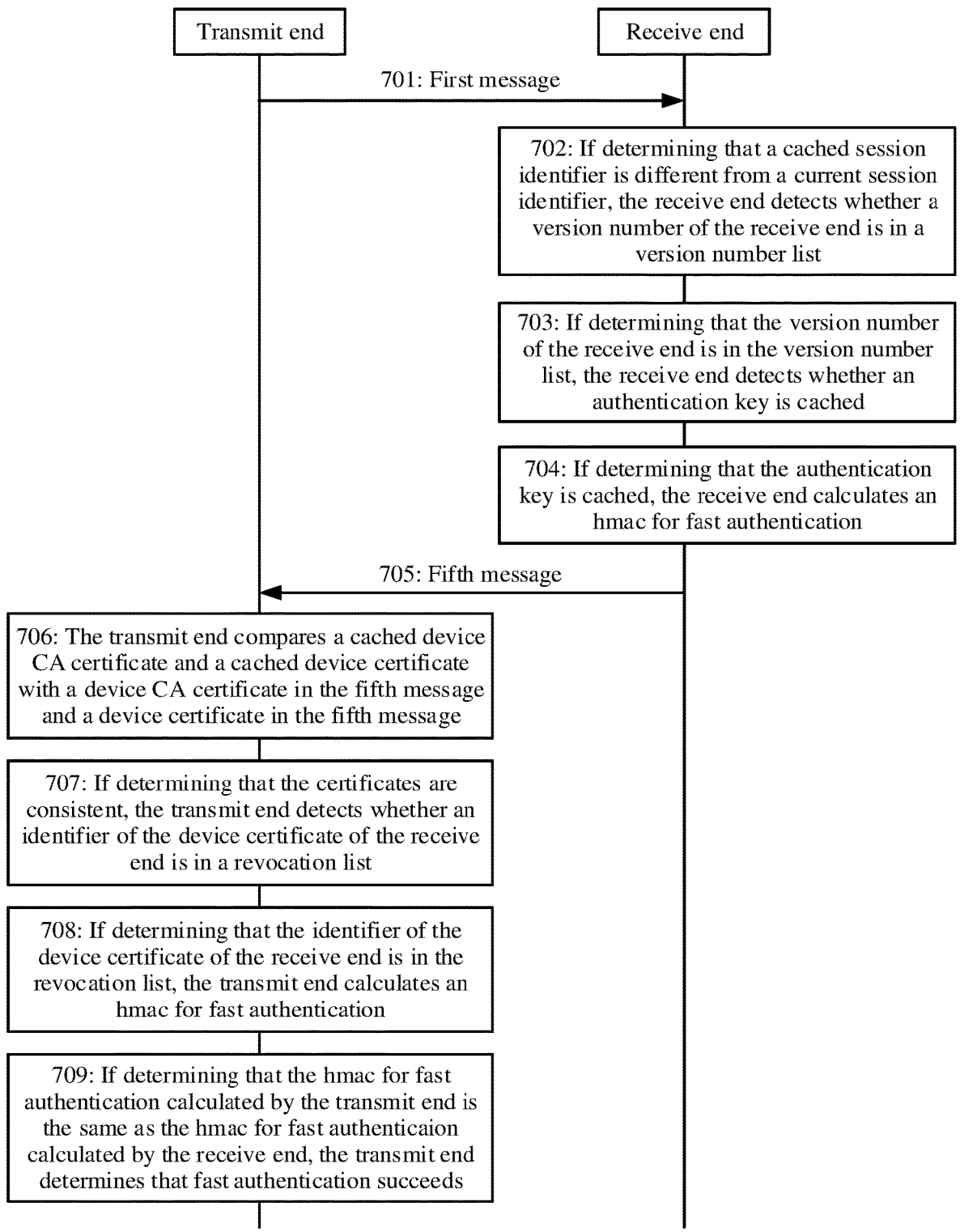
FIG. 7 is another example schematic flowchart of a content transmission protection method according to an embodiment of this application.

After the transmit end and the receive end complete one common authentication process, both the transmit end and the receive end cache the authentication key. Therefore, the transmit end and the receive end can implement fast authentication during next re-authentication. The following describes a fast authentication process with reference to FIG. 7. FIG. 7 is another schematic flowchart of a content transmission protection method according to an embodiment of this application. As shown in FIG. 7, the method includes the following steps.

701: A transmit end sends a first message to a receive end. The first message includes a current session identifier, a transmit end identifier, a version number list, a public key list, and a fast authentication identifier.

702: If determining that a cached session identifier is different from the current session identifier, the receive end detects whether a version number of the receive end is in the version number list.

703: If determining that the version number of the receive end is in the version number list, the receive end detects whether an authentication key is cached.

It should be noted that, for descriptions of the step 701 to the step 703, refer to related descriptions of the step 601 to the step 603.

704: If determining that the authentication key is cached, the receive end calculates an hmac for fast authentication.

If determining that the authentication key (authKey) is cached, the receive end calculates the hmac for fast authentication (hmacFastAuth=HMAC (sessionId∥txId∥version∥rxCert, authKey)) based on the transmit end identifier (txId), the version number (version) of the receive end, the current session identifier (sessionId), a device certificate (rxCert) of the receive end, and the cached authentication key (authKey).

705: The receive end sends a fifth message to the transmit end. The fifth message includes the current session identifier, the version number of the receive end, a device CA certificate of the receive end, the device certificate of the receive end, and the hmac for fast authentication calculated by the receive end.

After obtaining the hmac for fast authentication, the receive end may generate the fifth message (AKE_FAST_AUTH) based on the current session identifier, the version number of the receive end, the device CA certificate of the receive end, the device certificate of the receive end, and the hmac for fast authentication calculated by the receive end. The following describes each field of the fifth message with reference to Table 8, as shown in Table 8:

TABLE 8

AKE_FAST_AUTH

| Field | Length, in bytes (bytes) | Description |
|---|---|---|
| msgId | 2 | ID of a fifth message, with a value of 0x02 |
| sessionId | 8 | Current session identifier |
| Version | 2 | Version number supported by a receive end |
| caCertLen | 4 | Length of a device CA certificate of the receive end |
| caCert | caCertLen | Device CA certificate of the receive end |
| rxCertLen | 4 | Length of a device certificate of the receive end |
| rxCert | rcCertLen | Device certificate of the receive end |
| hmacFastAuthLen | 2 | If the authentication key authKey has been cached, set this field to a length of hmacFastAuth. Otherwise, set this field to 0. |
| hmacFastAuth | hmacFastAuthLen | hamc for fast authentication calculated by the receive end |

After obtaining the fifth message, the receive end sends the fifth message to the transmit end.

706: The transmit end compares a cached device CA certificate and a cached device certificate with the device CA certificate in the fifth message and the device certificate in the fifth message.

After receiving the fifth message, the transmit end may first check the session identifier in the fifth message. If the session identifier is inconsistent with the session identifier previously sent by the transmit end, the transmit end records an authentication status as a session identifier error, and stops the authentication process. If the session identifier is consistent with the session identifier previously sent by the transmit end, the transmit end determines whether the version number of the receive end in the fifth message is supported.

If the transmit end does not support the version number of the receive end, the transmit end records the authentication status as a protocol version number error and stops the authentication process. If the transmit end supports the version number of the receive end, the transmit end compares the cached device CA certificate and the cached device certificate with the device CA certificate in the fifth message and the device certificate in the fifth message.

707: If determining that the certificates are consistent, the transmit end detects whether an identifier of the device certificate of the receive end is in a revocation list.

If the transmit end determines that the certificates are consistent (to be specific, the cached device CA certificate and the cached device certificate are the same as the device CA certificate in the fifth message and the device certificate in the fifth message), the transmit end detects whether the identifier of the device certificate of the receive end is in the revocation list.

If determining that the certificates are inconsistent (to be specific, the cached device CA certificate and the cached device certificate are different from the device CA certificate in the fifth message and the device certificate in the fifth message), the transmit end records the authentication status as a certificate verification failure, and stops the authentication process.

708: If determining that the identifier of the device certificate of the receive end is in the revocation list, the transmit end calculates an hmac for fast authentication.

If determining that the identifier of the device certificate of the receive end is in the revocation list, the transmit end calculates the hmac for fast authentication (hmacFastAuth=HMAC (sessionId||txId||version||rxCert, authKey)) based on the transmit end identifier (txId), the version number (version) of the receive end, the current session identifier (sessionId), the device certificate (rxCert) of the receive end, and the cached authentication key (authKey).

If determining that the identifier of the device certificate of the receive end is not in the revocation list, the transmit end records the authentication status as certificate revocation and stops the authentication process.

709: If determining that the hmac for fast authentication calculated by the transmit end is the same as the hmac for fast authentication calculated by the receive end, the transmit end determines that fast authentication succeeds.

If determining that the hmac for fast authentication calculated by the transmit end is the same as the hmac for fast authentication calculated by the receive end, the transmit end determines that the fast authentication succeeds, and may set the authentication status of the receive end to be successful. If determining that the hmac for fast authentication calculated by the transmit end is not the same as the hmac for fast authentication calculated by the receive end, the transmit end determines that fast authentication fails, and stops the authentication process. It should be noted that once the transmit end stops the authentication process, the fast authentication identifier is set to 0, the fast authentication mode is disabled, and a common authentication process is restarted. In addition, after determining that fast authentication succeeds, the transmit end may further send a sixth message to the receive end, to notify the receive end that authentication succeeds.

In addition, an authentication status interface is provided for HTCP to query the authentication status of the transmit end.

Figure 8:
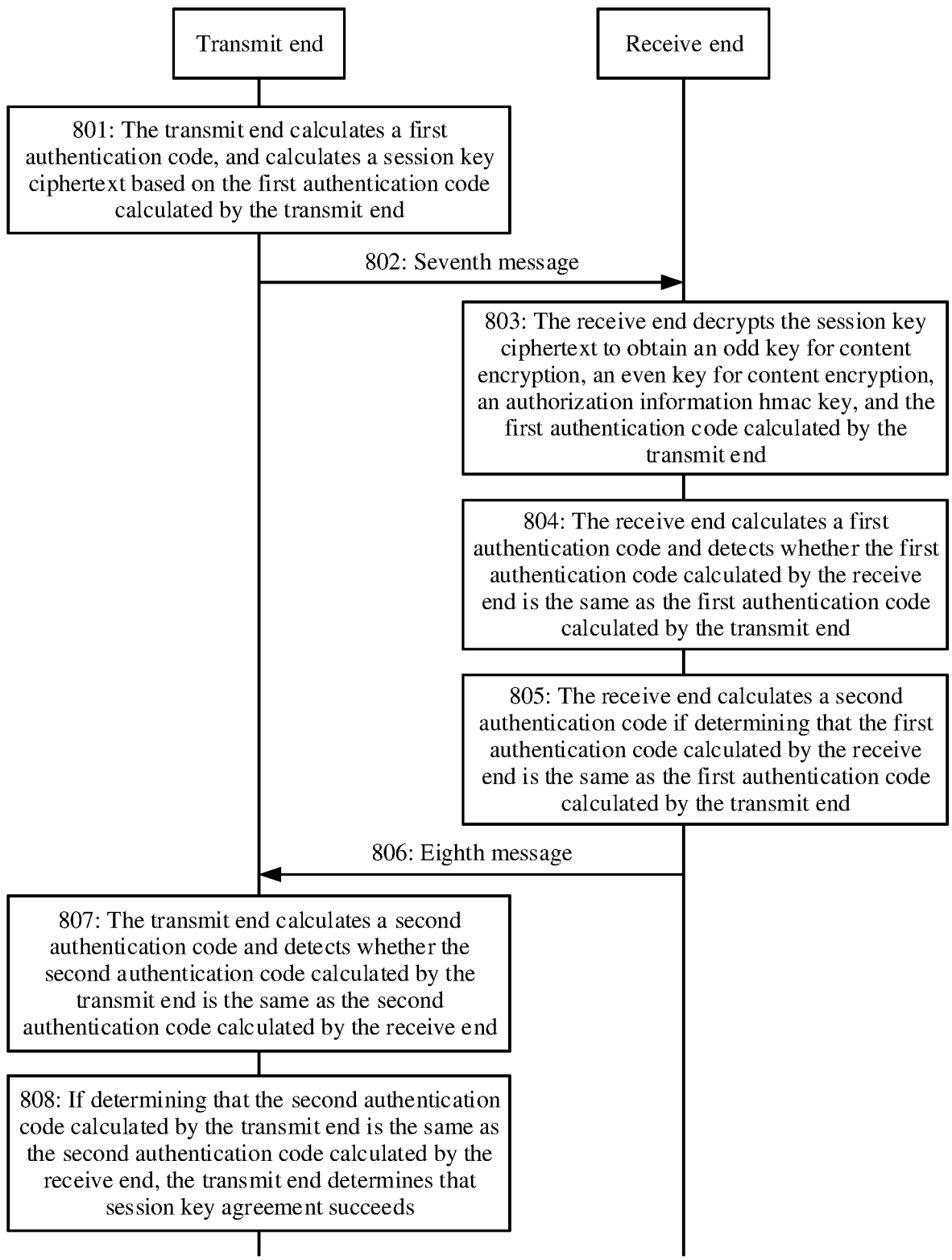
FIG. 8 is another example schematic flowchart of a content transmission protection method according to an embodiment of this application.

After completing authentication with the receive end, the transmit end updates a revocation list of the receive end based on an actual situation, and then starts a session key agreement process to determine keys used for content encryption, such as an odd key for content encryption (oddSessionKey), an even key for content encryption (evenSessionKey), and an authorization information hmac key (rcMacKey). If the content encryption key or an authorized HMAC key needs to be changed, the process may be restarted. To ensure continuity of content encryption, only the key that is not used to encrypt content is changed during switchover between the odd key and even key for content encryption. FIG. 8 is another schematic flowchart of a content transmission protection method according to an embodiment of this application. As shown in FIG. 8, the method includes the following steps.

801: A transmit end calculates a first authentication code, and calculates a session key ciphertext based on the first authentication code calculated by the transmit end.

When session key agreement is needed, the transmit end may first generate 128-bit random numbers: an odd key for content encryption (oddSessionKey), an even key for content encryption (evenSessionKey), an authorization information hmac key (rcMacKey), and an initialization variable (iv).

Then, the transmit end calculates the first authentication code (m=HMAC (sessionId||oddSessionKey||evenSessionKey||rcMacKey||iv, hmacKey)) based on a current session identifier, the odd key for content encryption, the even key for content encryption, the authorization information hmac key, the initialization variable, and an hmac key (hmacKey). The hmac key is derived from an authentication key (authKey) cached by the transmit end.

Further, the transmit end calculates the session key ciphertext (sessionEncData=SessionKeyEncrypt (sessionId||oddSessionKey||evenSessionKey||rcMacKey||m, encKey, iv)) based on the current session identifier, the odd key for content encryption, the even key for content encryption, the authorization information hmac key, the initialization variable, the first authentication code calculated by the transmit end, and an encryption key (encKey). SessionKeyEncrypt is a session key encryption method. The encryption key is derived from the authentication key (authKey).

802: The transmit end sends a seventh message to a receive end. The seventh message includes the current session identifier, the initialization variable, and the session key ciphertext.

After obtaining the session key ciphertext, the transmit end may generate the seventh message (SKA_SESSION_KEYS) based on the current session identifier, the initialization variable, and the session key ciphertext. The following describes each field of the seventh message with reference to Table 9, as shown in Table 9:

TABLE 9

SKA_SESSION_KEYS

| Field | Length, in bytes (bytes) | Description |
| --- | --- | --- |
| msgId | 2 | ID of a seventh message, with a value of 0x05 |
| sessionId | 8 | Current session identifier |
| ivLen | 4 | Length of iv |
| Iv | ivLen | iv for encrypting a session key |
| sessionEncDataLen | 4 | Length of a session key ciphertext |
| sessionEncData | sessionEncDataLen | Session key ciphertext, including oddSessionKey, evenSessionKey, rcMacKey, |

TABLE 9-continued

SKA_SESSION_KEYS

| Field | Length, in bytes (bytes) | Description |
| --- | --- | --- |
| | | and a first authentication code calculated by a transmit end |

After obtaining the seventh message, the transmit end sends the seventh message to the receive end.

803: The receive end decrypts the session key ciphertext to obtain the odd key for content encryption, the even key for content encryption, the authorization information hmac key, and the first authentication code calculated by the transmit end.

After receiving the seventh message, the receive end may check the session identifier in the seventh message. After checking, an encryption password may be derived based on the cached authentication key. Then, the receive end decrypts the session key ciphertext based on the initialization variable and the encryption password to obtain the odd key for content encryption (oddSessionKey), the even key for content encryption (evenSessionKey), the authorization information hmac key (rcMacKey), and the first authentication code (m) calculated by the transmit end.

804: The receive end calculates a first authentication code and detects whether the first authentication code calculated by the receive end is the same as the first authentication code calculated by the transmit end.

After decrypting the session key ciphertext to obtain the odd key for content encryption, the even key for content encryption, the authorization information hmac key, and the first authentication code calculated by the transmit end, the receive end may calculate the first authentication code (m=HMAC (sessionId||oddSessionKey||evenSessionKey||rcMacKey||iv, hmacKey)) based on the current session identifier, the odd key for content encryption, the even key for content encryption, the authorization information hmac key, the initialization variable, and the hmac key (hmacKey). The hmac key (hmacKey) is derived from the authentication key (authKey) cached by the receive end.

Then, the receive end detects whether the first authentication code calculated by the receive end is the same as the first authentication code calculated by the transmit end.

805: The receive end calculates a second authentication code if determining that the first authentication code calculated by the receive end is the same as the first authentication code calculated by the transmit end.

If determining that the first authentication code calculated by the receive end is the same as the first authentication code calculated by the transmit end, the receive end may calculate the second authentication code (h=HMAC (sessionId||oddSessionKey||evenSessionKey||rcMacKey, hmacKey)) based on the current session identifier, the odd key for content encryption, the even key for content encryption, the authorization information hmac key, and the hmac key.

806: The receive end sends an eighth message to the transmit end. The eighth message includes the current session identifier and the second authentication code calculated by the receive end.

After calculating the second authentication code, the receive end may generate the eighth message (SKA_SESSION_KEYS_ACK) based on the current session identifier and the second authentication code calculated by the receive end. The following describes each field of the eighth message with reference to Table 10, as shown in Table 10:

TABLE 10

Eighth message

| Field | Length, in bytes (bytes) | Description |
| --- | --- | --- |
| msgId | 2 | ID of an eighth message, with a value of 0x06 |
| sessionId | 8 | Current session identifier |
| hLen | 4 | Length of a second authentication code calculated by a receive end |
| h | hLen | Second authentication code calculated by the receive end |

After obtaining the eighth message, the receive end sends the eighth message to the transmit end.

807: The transmit end calculates a second authentication code and detects whether the second authentication code calculated by the transmit end is the same as the second authentication code calculated by the receive end.

After receiving the eighth message, the transmit end may check the session identifier in the eighth message. After checking, the transmit end may calculate the second authentication code (h=HMAC (sessionId||oddSessionKey||evenSessionKey||rcMacKey, hmacKey)) based on the current session identifier, the odd key for content encryption, the even key for content encryption, the authorization information hmac key, and the hmac key.

Then, the transmit end detects whether the second authentication code calculated by the transmit end is the same as the second authentication code calculated by the receive end.

808: If determining that the second authentication code calculated by the transmit end is the same as the second authentication code calculated by the receive end, the transmit end determines that the session key agreement succeeds.

If determining that the second authentication code calculated by the transmit end is the same as the second authentication code calculated by the receive end, the transmit end determines that the session key agreement succeeds, and may determine the odd key for content encryption, the even key for content encryption, and the authorization information hmac key as session keys. Then, the transmit end may further send a ninth message to the receive end, to notify the receive end that the odd key for content encryption and the even key for content encryption may be used for content decryption, in other words, determine the odd key for content encryption, the even key for content encryption, and the authorization information hmac key as the session keys.

If the transmit end determines that the second authentication code calculated by the transmit end is not the same as the second authentication code calculated by the receive end, the step 801 is performed again. The transmit end may perform the operation for eight times again. If the operation still fails, the transmit end records an authentication status of the receive end as a session key agreement failure, terminates the session key agreement, and restarts an authentication key exchange process.

Figure 9:
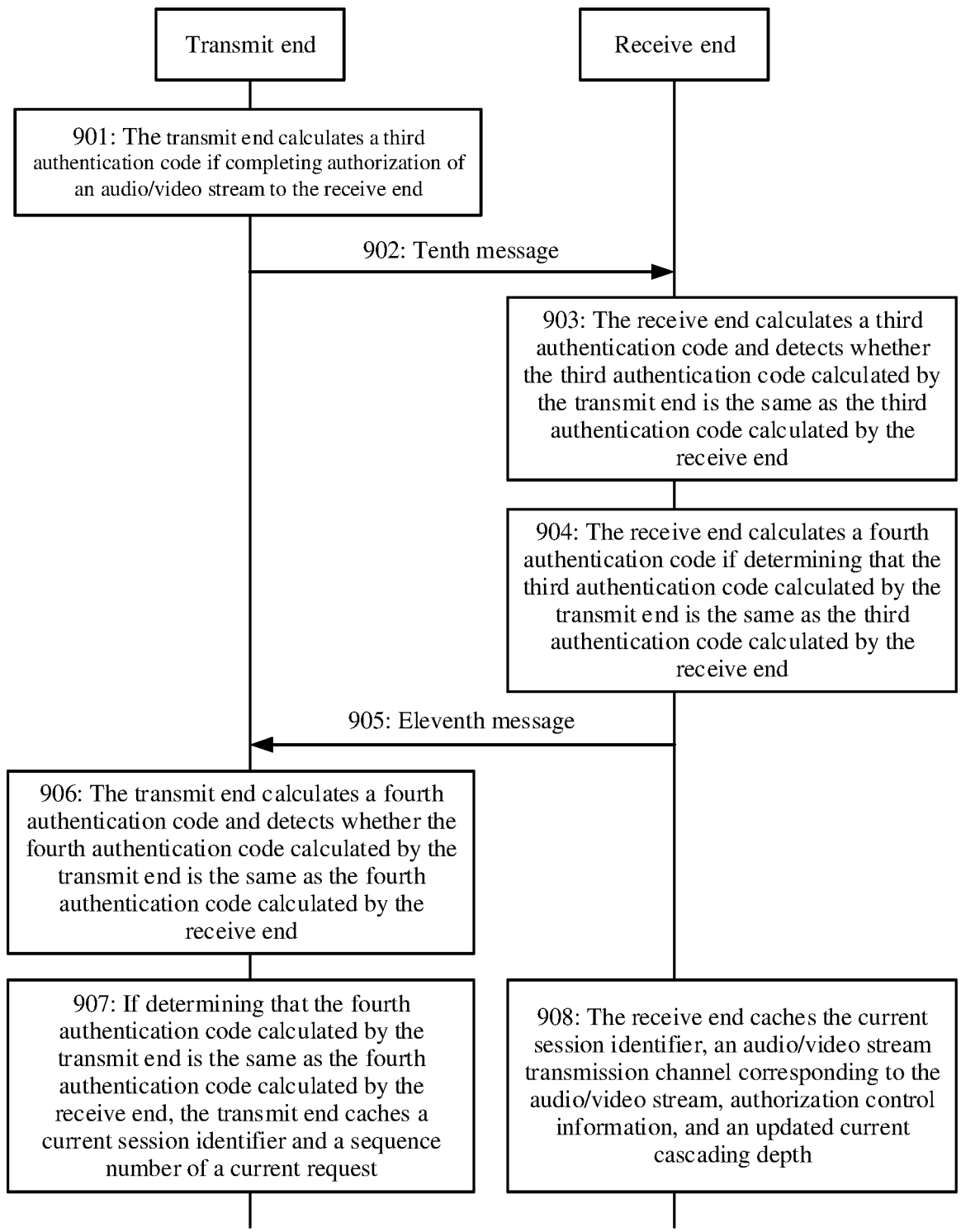
FIG. 9 is another example schematic flowchart of a content transmission protection method according to an embodiment of this application.

After the session key agreement process is completed, the transmit end needs to complete authorization control before sending an audio/video stream to the receive end. After completing authorization control, the transmit end may further send authorization information to the receive end, so that the receive end completes authorization control on a lower-level device. The following describes the foregoing authorization control process with reference to FIG. 9. FIG. 9 is another schematic flowchart of a content transmission protection method according to an embodiment of this application. Refer to FIG. 9. The method includes the following steps.

901: A transmit end calculates a third authentication code if completing authorization of an audio/video stream to a receive end.

After completing a session key agreement process, the transmit end may perform authorization control of the audio/video stream on the receive end. Specifically, when needing to transmit the audio/video stream to the receive end, the transmit end may first verify permission of the receive end based on authorization control information of the audio/video stream. The permission of the receive end includes: a security level of the receive end, a number of copy times of the receive end, a time for the receive end to reserve content, a cascading depth of the receive end, and a number of devices connected to the receive end. Specifically, when the transmit end determines that the security level of the receive end is higher than or equal to a security level of the transmit end, the number of copy times of the receive end (namely, a number of times that the receive end can copy the audio/video stream) is less than or equal to a copy limit (restricted number of copy times), the time for the receive end to reserve the audio/video stream is less than or equal to a preset reservation time, the cascading depth of the receive end is less than or equal to a maximum cascading depth, and the number of devices connected to the receive end is less than or equal to a maximum number that can be supported by a level of the receive end. In this case, the permission of the receive end is successfully verified.

After the transmit end successfully verifies the permission of the receive end, it is equivalent to that authorization (that is, authorization control) on the audio/video stream is completed for the receive end. In this case, the audio/video stream may be transmitted to the receive end. It should be noted that, because an audio/video stream transmission channel is uniquely bound to the audio/video stream, the transmit end needs to transmit the audio/video stream on the audio/video stream transmission channel corresponding to the audio/video stream.

If the transmit end fails to verify the permission of the receive end, it is equivalent to that authorization on the audio/video stream is not completed for the receive end. In this case, the audio/video stream is not transmitted to the receive end.

It should be understood that if the transmit end further needs to transmit another audio/video stream to the receive end, the foregoing operation only needs to be repeatedly performed.

After completing authorization control of the audio/video stream on the receive end, the transmit end may further send authorization information of the audio/video stream to the receive end, so that the receive end completes authorization control of the audio/video stream on a lower-level device, and the receive end may transmit the audio/video stream to the lower-level device.

Specifically, after successfully verifying the permission of the receive end, the transmit end may first obtain the authorization information of the audio/video stream: the audio/video stream transmission channel (streamChannelId) corresponding to the audio/video stream, the authorization control information (rights control information, RCI), the current cascading depth (depth), a sequence number (seqNum) of a current request, and an authorization information hmac key (rcMacKey) cached by the transmit end. The authorization control information is shown in Table 11:

TABLE 11

Authorization control information

| Field | Length, in bytes (bytes) | Description |
| --- | --- | --- |
| Version | 2 | Version number of authorization control information. A current version is 0x01. |
| Security Level | 1 | Security level. Content can be used only on a device with a same or higher security level. |
| Copy Control | 1 | Copy limit, that is, a number of times that a receive end can copy the content. 0xFF indicates no limit. |
| Keep Time | 4 | Reservation time, which is an unsigned integer. The time that the receive end can reserve the content is limited. A unit is minute. 0xFFFFFFFF indicates no limit. |
| Max Depth | 1 | Maximum cascading depth |
| Max Count | 1 | Maximum number of connected devices of each level |

The security level is defined in Table 12:

TABLE 12

Security level

| Level | Secure storage | Cryptographic algorithm implementation | Stream protection |
| --- | --- | --- | --- |
| 1 | Software-only implementation | Software-only implementation | Software-only implementation |
| 2 | A root key protected by Implementation through hardware-protected root key encryption or implementation through encryption protection by adding an SE to a chip | Trusted execution environment (trusted execution environment, TEE) software or hardware algorithm implementation | TEE or hardware implementation |
| 3 | Same as the level 2 | Hardware algorithm implementation, which supports a side-channel attack defense and physical attack | Hardware implementation. Software cannot read a stream. |

In the authorization information of the audio/video stream, the audio/video stream transmission channel corresponding to the audio/video stream indicates the audio/video stream (because the audio/video stream transmission channel is uniquely bound to the audio/video stream). Therefore, after receiving the authorization control information, the receive end may determine, based on the audio/video stream transmission channel corresponding to the audio/video stream, that the authorization control information corresponds to the audio/video stream, to perform authorization control on the audio/video stream for the lower-level device based on the authorization control information corresponding to the audio/video stream. The current cascading depth is a cascading depth of the transmit end. Generally, the current cascading depth of a transmitter may be set to 1, and a cascading depth of a subsequent device of each level may be increased by 1. In first authorization control (namely, authorization control of a first audio/video stream) after identity authentication and key agreement, the sequence number of the current request is initialized to 1. In subsequent new authorization control (authorization control of another audio/video stream), the sequence number of the current request may be increasing a locally cached sequence number of the transmit end by 1.

Then, the transmit end may calculate the third authentication code (k=HMAC (sessionId||streamChannelId||RCI||depth||seqNum, rcMacKey)) based on the current session identifier, the authorization information of the audio/video stream (to be specific, the audio/video stream transmission channel corresponding to the audio/video stream, the authorization control information, the current cascading depth, and the sequence number of the current request), and the authorization information hmac key cached by the transmit end.

902: The transmit end sends a tenth message to the receive end. The tenth message includes the current session identifier, the authorization information of the audio/video stream, and the third authentication code calculated by the transmit end.

After calculating the third authentication code, the transmit end may generate the tenth message (RC_POLICY) based on the current session identifier, the authorization information of the audio/video stream (the audio/video stream transmission channel corresponding to the audio/video stream, the authorization control information, the current cascading depth, and the sequence number of the current request), and the third authentication code calculated by the transmit end. The following describes each field of the tenth message with reference to Table 13, as shown in Table 13:

TABLE 13

RC_POLICY

| Field | Length, in bytes (bytes) | Description |
| --- | --- | --- |
| msgId | 2 | ID of a tenth message, with a value of 0x07 |
| sessionId | 8 | Current session identifier |
| streamChannelId | 8 | Audio/Video stream transmission channel. Each audio/video stream corresponds to an audio/video stream transmission channel. Audio/video streams and audio/video stream transmission channels are bound one by one. |
| rciLen | 4 | Length of authorization control information |
| RCI | rciLen | Authorization control information |
| Depth | 4 | Current cascading depth |
| seqNum | 8 | Sequence number of a current request |
| kLen | 4 | Length of a third authentication code |
| k | kLen | Third authentication code |

After obtaining the tenth message, the transmit end sends the tenth message to the receive end.

It should be noted that, if the transmit end needs to enable the receive end to perform authorization control on a plurality of audio/video streams for the lower-level device of the receive end, the transmit end needs to send authorization information of these audio/video streams to the receive end, to be specific the transmit end needs to perform the step 901 to step 908 for a plurality of times. In other words, the transmit end may simultaneously send a plurality of pieces of tenth information to the receive end. For example, the transmit end simultaneously sends two pieces of tenth information to the receive end. A first piece of tenth information includes authorization control information and an audio/video stream transmission channel corresponding to an audio/video stream A. A second piece of tenth information includes authorization control information and an audio/video stream transmission channel corresponding to an audio/video stream B. In this case, the receive end may determine, based on the audio/video stream transmission channel corresponding to the audio/video stream A, that the authorization control information in the first piece of tenth information corresponds to the audio/video stream A, and may determine, based on the audio/video stream transmission channel corresponding to the audio/video stream B, that the authorization control information in the second piece of tenth information corresponds to the audio/video stream B.

903: The receive end calculates a third authentication code and detects whether the third authentication code calculated by the transmit end is the same as the third authentication code calculated by the receive end.

After receiving the tenth message, the receive end may check the session identifier in the tenth message. After checking, the receive end may detect whether the sequence number of the current request is greater than or equal to a sequence number cached by the receive end, and if yes, the receive end calculates the third authentication code (k=HMAC (sessionId||streamChannelId||RCI||depth||seqNum, rcMacKey)) based on the current session identifier, the authorization information of the audio/video stream (to be specific, the audio/video stream transmission channel corresponding to the audio/video stream, the authorization control information, the current cascading depth, and the sequence number of the current request), and the authorization information hmac key cached by the receive end.

Then, the receive end detects whether the third authentication code calculated by the transmit end is the same as the third authentication code calculated by the receive end.

If the sequence number of the current request of the receive end is smaller than the sequence number cached by the receive end, an error message is returned to the transmit end, to notify the transmit end of an authorization sequence number error.

904: The receive end calculates a fourth authentication code if determining that the third authentication code calculated by the transmit end is the same as the third authentication code calculated by the receive end.

If determining that the third authentication code calculated by the transmit end is the same as the third authentication code calculated by the receive end, the receive end calculates the fourth authentication code (p=HMAC (sessionId||streamChannelId||RCI||depth||(seqNum+1), rcMacKey)) based on the current session identifier, the authorization information of the audio/video stream (to be specific, the audio/video stream transmission channel corresponding to the audio/video stream, the authorization control information, the current cascading depth, and the sequence number of the current request), and the cached authorization information hmac key. It should be understood that (seqNum+1) is increasing the sequence number of the current request by 1.

If determining that the third authentication code calculated by the transmit end is different from the third authentication code calculated by the receive end, the receive end returns an error message to the transmit end, to notify the transmit end of an authorization error.

905: The receive end sends an eleventh message to the transmit end. The eleventh message includes the current session identifier and the fourth verification code calculated by the receive end.

After calculating a fourth authentication code, the transmit end may generate the eleventh message (RC_POLICY_ACK) based on the current session identifier, the authorization information of the audio/video stream (the audio/video stream transmission channel corresponding to the audio/video stream, the authorization control information, the current cascading depth, and the sequence number of the current request), and the fourth authentication code calculated by the transmit end. The following describes each field of the eleventh message with reference to Table 14, as shown in Table 14:

TABLE 14

| | | RC_POLICY_ACK |
|---|---|---|
| Field | Length, in bytes (bytes) | Description |
| msgId | 2 | ID of an eleventh message, with a value of 0x08 |
| sessionId | 8 | Current session identifier |
| pLen | 4 | Length of a fourth authentication code |
| P | pLen | Fourth authentication code |

After obtaining the eleventh message, the receive end sends the eleventh message to the transmit end.

906: The transmit end calculates the fourth authentication code and detects whether the fourth authentication code calculated by the transmit end is the same as the fourth authentication code calculated by the receive end.

After receiving the eleventh message, the transmit end may check the session identifier in the eleventh message. After checking, the transmit end may calculate the fourth authentication code (p=HMAC (sessionId||streamChannelId||RCI||depth||(seqNum+1), rcMacKey)) based on the current session identifier, the authorization information of the audio/video stream (to be specific, the audio/video stream transmission channel corresponding to the audio/video stream, the authorization control information, the current cascading depth, and the sequence number of the current request), and the cached authorization information hmac key.

Then, the transmit end detects whether the fourth authentication code calculated by the transmit end is the same as the fourth authentication code calculated by the receive end.

907: If determining that the fourth authentication code calculated by the transmit end is the same as the fourth authentication code calculated by the receive end, the transmit end caches the current session identifier and the sequence number of the current request.

If determining that the fourth authentication code calculated by the transmit end is the same as the fourth authentication code calculated by the receive end, the transmit end determines that transfer of the authorization information is completed, and caches the current session identifier (sessionId) and the sequence number (seqNum) of the current request. In addition, the transmit end may further send a twelfth message to the receive end, to notify the receive end that transfer of the authorization information is completed.

If determining that the fourth authentication code calculated by the transmit end is different from the fourth authentication code calculated by the receive end, the transmit end determines that a current status is an authorization error, and stops the process.

908: The receive end caches the current session identifier, the audio/video stream transmission channel corresponding to the audio/video stream, the authorization control information, and an updated current cascading depth.

After receiving the twelfth message, the receive end may increase the current cascading depth (depth) by 1, to obtain the updated current cascading depth (depth+1), that is, obtain the cascading depth of the receive end. Then, the receive end may cache the current session identifier, the audio/video stream transmission channel corresponding to the audio/video stream, the authorization control information, and the updated current cascading depth.

Because the receive end successfully obtains the authorization information of the audio/video stream, if the receive end is connected to a lower-level device, permission of the lower-level device may be verified based on the authorization control information (refer to the step 901). After verification succeeds, it is equivalent to completing authorization of the audio/video stream. In this case, the audio/video stream may be transmitted to the lower-level device through the audio/video stream transmission channel corresponding to the audio/video stream.

In addition, if the transmit end is a transmitter (that is, a level-1 device), a content authorization system invokes an authorization interface of the transmitter to send the authorization control information of the audio/video stream to the transmitter. The transmitter receives the authorization control information of the audio/video stream from the content authorization system through the authorization interface, performs authorization control on the audio/video stream for the receive end based on the authorization control information, and sends the authorization information to the lower-level device of the receive end. If the transmit end is a repeater (that is, a non-level-1 device), the authorization control information of the audio/video stream is from an upper-level device of the transmit end.

Further, to prevent the receive end from receiving, beyond a distance, the audio/video stream sent by the transmit end, the transmit end needs to detect location validity of the receive end. In the embodiment shown in FIG. 9, if a time from a moment when the transmit end sends the tenth message (RC_POLICY) to a moment when the transmit end receives the eleventh message (RC_POLICY_ACK) does not exceed an allowed minimum authorization sending time of the interface (the time needs to be set based on specific interface performance), location check of the receive end passes. Otherwise, the location check of the receive end needs to be retried for a maximum of eight times. If the location check still fails, the current status is recorded as a location check error, and encryption and sending of the audio/video stream are stopped, that is, the process is stopped.

Further, a version of the authorization control message may be continuously upgraded based on service requirements, but a later version needs to be downward compatible with an earlier version.

After completing an authorization control process, the transmit end may start a content encryption process. Specifically, the transmit end may use an agreed content encryption key in the session key agreement process to encrypt the audio/video stream transmitted in a link, and the receive end uses the content encryption key to decrypt the audio/video stream.

Figure 10:
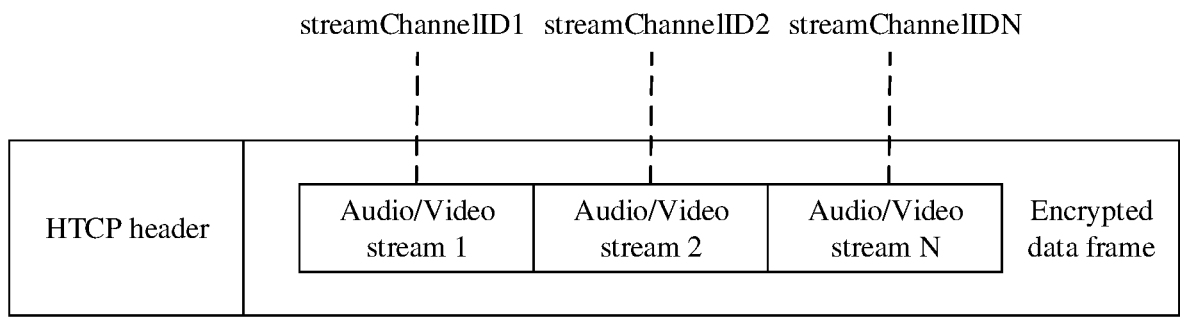
FIG. 10 is an example schematic diagram of a structure of a data frame according to an embodiment of this application.

In the content encryption process, the transmit end may first generate an encryption information header (HTCP header) and send an encrypted data frame together to the receive end. The encrypted data frame includes data of at least one audio/video stream. FIG. 10 is a schematic diagram of a structure of the data frame according to an embodiment of this application. As shown in FIG. 10, when the transmit end sends encrypted data to the receive end, it is assumed that the transmit end needs to send data of N audio/video streams to the receive end (for example, in FIG. 10, streamChannelId1 corresponds to an audio/video stream 1, streamChannelId2 corresponds to an audio/video stream 2, . . . , and streamChannelIdN corresponds to an audio/video stream N).

The data of the N audio/video streams may be set in a same data frame and sent to the receive end together.

A field of the encryption information header is defined in Table 15.

TABLE 15

Encryption information header

| Field | Length, in bits (bits) | Description |
| --- | --- | --- |
| Version | 8 | Version number of an encryption information header, with a current value of 1 |
| Encrypted Method | 2 | Encryption method: When a value is 0, it indicates no encryption. When a value is 1, an odd key for content encryption is used. When a value is 2, an even key for content encryption is used. When a value is 3, the key is unavailable currently. |
| Encryption Algorithm | 2 | Encryption algorithm: When a value is 0, SM4 is used. When a value is 1, AES-128 is used. |
| Encryption mode | 2 | Encryption mode: When a value is 0, a CTR mode is used. When a value is 1, a GCM mode is used. The CTR mode is used in an ultra-HD transmission interface and a unidirectional audio/video digital content transmission interface. The GCM mode is used for wireless projection. |
| Reserved | 2 | Reserved |
| Counter | 128 | Counter in the CTR mode: The counter is randomly generated by the transmit end for the first time. A length of each new data frame is accumulated by a data frame length/16 + 1. In the CTR mode, a transmission link layer provides an error correction mechanism. IV of a GCM algorithm: is randomly generated by the transmit end for the first time. |

After the encryption information header is determined, the encryption method, the encryption algorithm, the encryption mode, and the counter in the encryption information header may be used to encrypt the data of the audio/video stream.

It should be noted that, after successfully authenticating the receive end, the transmit end may check whether an update time (thisUpdate) field of a locally stored revocation list is greater than an update time (crlThisUpdate) field of a revocation list of the receive end obtained in the authentication process, that is, whether version update is needed. If yes, the transmit end needs to send a revocation list update message to the receive end to update the revocation list of the receive end.

The content authorization system may invoke a revocation list update interface of the transmitter to update the revocation list, and may send the revocation list at any time.

A revocation list update process may be asynchronously implemented in a level-by-level update process to ensure sending performance.

When the revocation list is delivered level by level, if the locally stored revocation list of the receive end is later than the received revocation list, the local revocation list is not updated, but the local revocation list needs to be sent to the lower-level device. After being updated, the revocation list needs to be stored in a local non-volatile storage.

After the revocation list is updated, the receive end needs to use the revocation list again to verify whether a certificate of the lower-level device is revoked. If authentication of the certificate of the lower-level device fails, the receive end needs to stop sending the audio/video stream to the lower-level device.

A latest revocation list should be added to the device before delivery.

Figure 11:
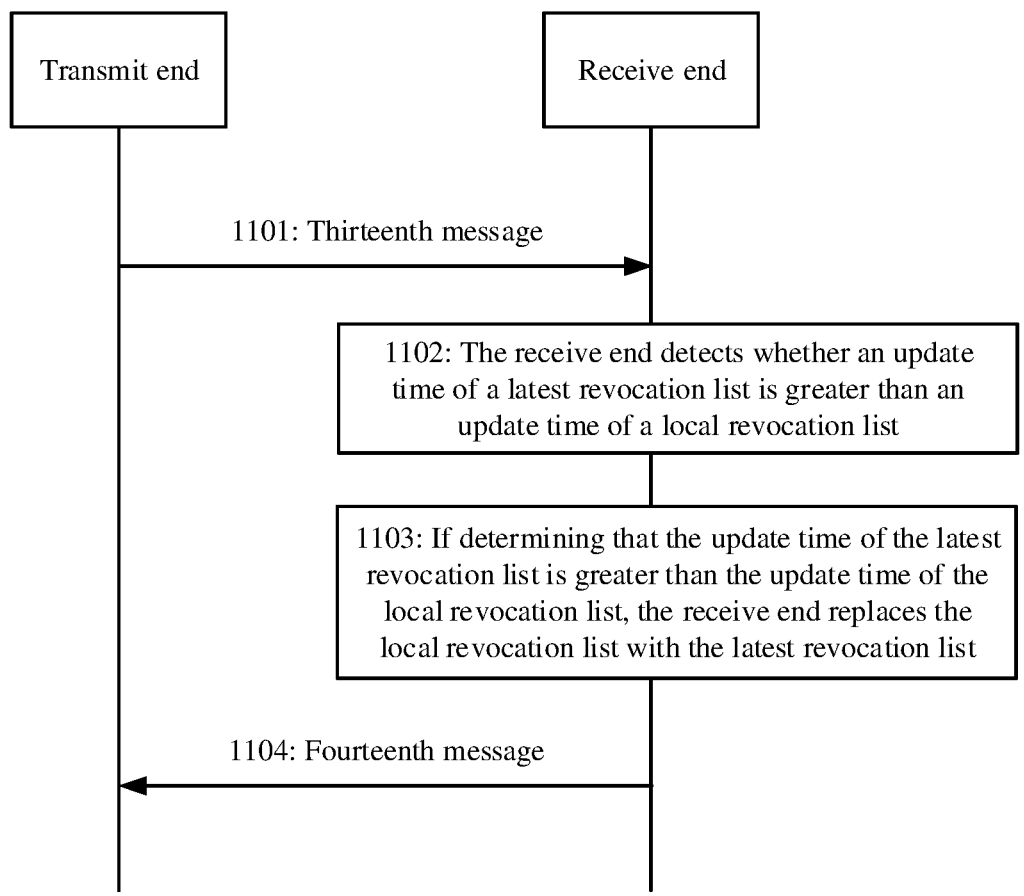
FIG. 11 is another example schematic flowchart of a content transmission protection method according to an embodiment of this application.

The following describes a revocation list update process with reference to FIG. 11. FIG. 11 is another schematic flowchart of a content transmission protection method according to an embodiment of this application. As shown in FIG. 11, the method includes the following steps.

1101: A transmit end sends a thirteenth message to a receive end. The thirteenth message includes a latest revocation list.

After authentication is completed, the transmit end may send the thirteenth message (CRL_UPDATE, that is, the foregoing revocation list update message) to the receive end. The message includes a latest revocation list (namely, a revocation list of the transmit end). The following describes the thirteenth message with reference to Table 16, as shown in Table 16:

TABLE 16

CRL_UPDATE

| Field | Length, in bytes (bytes) | Description |
|---|---|---|
| msgId | 2 | ID of a thirteenth message, with a value of 0x09 |
| crlLen | 4 | Length of a revocation list |
| CRL | crlLen | Latest revocation list |

1102: The receive end detects whether an update time of the latest revocation list is greater than an update time of a local revocation list.

After obtaining the latest revocation list, the receive end may use a certificate chain to verify a signature of the revocation list, and detect whether the update time of the latest revocation list is greater than the update time of the local revocation list.

1103: If determining that the update time of the latest revocation list is greater than the update time of the local revocation list, the receive end replaces the local revocation list with the latest revocation list.

If determining that the update time of the latest revocation list is greater than the update time of the local revocation list, the receive end replaces the local revocation list with the latest revocation list, that is, updates the revocation list. If the receive end is further connected to a lower-level device, after updating the revocation list, the receive end may further use the revocation list to verify whether a certificate of the lower-level device is revoked.

If determining that the update time of the latest revocation list is not greater than the update time of the local revocation list, the receive end returns an error message to the transmit end to notify a revocation list error. Then, the transmit end may perform the step 1101 again, and perform the operation again for a maximum of 8 times. If the operation still fails, the process is stopped.

1104: The receive end sends a fourteenth message to the transmit end. The fourteenth message indicates that the revocation list of the receive end is successfully updated.

The following describes the fourteenth message (CRL_UPDATE ACK) with reference to Table 17, as shown in Table 17:

TABLE 17

CRL_UPDATE_ACK

| Field | Length, in bytes (bytes) | Description |
|---|---|---|
| msgId | 2 | ID of a fourteenth message, with a value of 0x0A |
| Status | 1 | Update success status, with a value of 0 |

In addition, in the embodiments shown in FIG. 6A to FIG. 11, all fields of the error message (ERROR_ACK) are shown in Table 18:

TABLE 18

ERROR_ACK

| Field | Length (bytes) | Description |
|---|---|---|
| msgId | 2 | ID of an error message, with a value of 0xFF |
| sessionId | 8 | Current session identifier |
| errorNO | 2 | Error code |
| errorMsgLen | 1 | Length of the error message |
| errorMsg | 4 | Error message |

A status corresponding to each value of the error code is shown in Table 19:

TABLE 19

Error code

| Error code | Status | Description |
|---|---|---|
| 0 | Normal status | Normal status |
| 0xFFF1 | Protocol version error | A transmit end does not support a protocol version of a receive end in an authentication key exchange process. |
| 0xFFF2 | Certificate verification failure | The transmit end fails to verify a signature of a certificate of the receive end in the authentication key exchange process. |
| 0xFFF3 | Certificate revocation | In the authentication key exchange process, the certificate of the receive end is in a revocation list. |
| 0xFFF4 | Authentication key verification failure | In the authentication key exchange process, the transmit end and the receive end fail to verify an hmac after agreeing on an authentication key. |
| 0xFFF5 | Session key agreement failure | In a session key agreement process, the transmit end and the receive end fail to verify the hmac after agreeing on a session key. |
| 0xFFF6 | Session identifier error | Session identifier error |
| 0xFFF7 | HMAC verification error | HMAC verification error |
| 0xFFF8 | Authorization error | Authorization error |
| 0xFFF9 | Authorization sending error | Authorization sending error |
| 0xFFFA | Location check error | Location check error |
| 0xFFFB | Response timeout | Response timeout |
| 0xFFFC | Random number error | Random number error |
| 0xFFFD | Authorization sequence number error | Authorization sequence number error |

In this embodiment, the authentication key exchange process and the session key agreement process between the transmit end and the receive end are implemented in a process of establishing a transmission link between the transmit end and the receive end, and an authorization control process and an audio/video stream transmission process between the transmit end and the receive end are implemented after establishment of the transmission link between the transmit end and the receive end is completed. Therefore, in this application, an authentication process between the audio/video stream transmission process between the transmit end and the receive end may be implemented in different time periods, and are two independent processes, so that, when the transmit end and the receive end perform authentication, the audio/video stream is not transmitted. This can avoid leakage of the audio/video stream.

Further, this embodiment further has the following advantages: (1) Distributed authentication: each device group can complete independent authentication, and each device can independently authorize a lower-level device. In addition, authorization control can be performed for use of local content. A model is simpler and easy to implement and promote. (2) Authorization based on a transmitted audio/video stream and link-based content encryption are supported. In addition to ensuring authorization granularity, a plurality of streams can be reused and then transmitted and encrypted. (3) Authentication and key agreement are implemented when a device connection is established. Re-authentication is not needed before content transmission. This improves performance. (4) Identity authentication, key agreement, revocation list update, authorization control, and interaction between upper-level devices and between lower-lower devices are independent of each other, and are asynchronous operations. This improves performance. (5) Authorization is more flexible. In addition to authorization control on location check, a version, a copy limit, a reservation time, a maximum cascading depth, and a maximum number of connected devices supported by a device of each level, security level control is also supported to restrict a receive device based on a content security level. This effectively improves system security. (5) An authorization sending and confirmation mechanism ensures that a receive end correctly receives authorization, to improve authorization security. (6) Independent encryption of a data frame is supported for content encryption. This solves a problem of frame synchronization decryption and improves user experience. Key change is supported, to improve security. CTR model encryption and parallel encryption and decryption of a hardware algorithm engine are supported, to improve performance. (7) An adaptive algorithm system is implemented based on a certificate type of the receive end.

Figure 12:
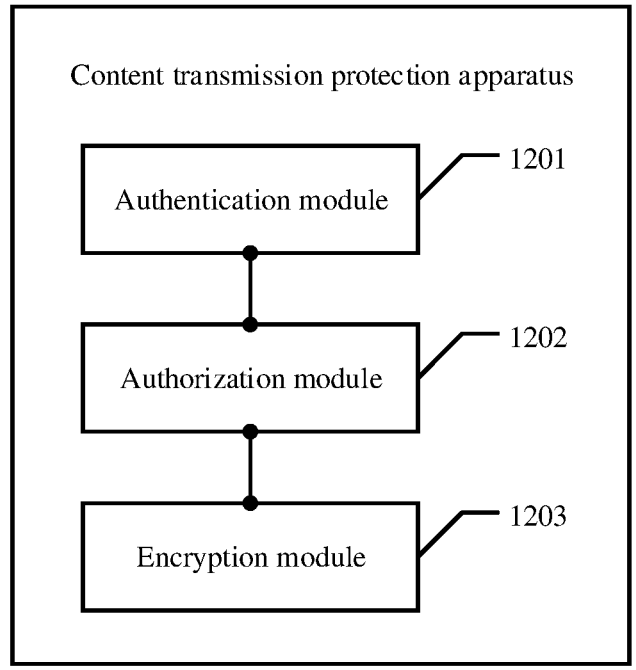
FIG. 12 is an example schematic diagram of a structure of a content transmission protection apparatus according to an embodiment of this application.

The foregoing specifically describes the content transmission protection method provided in embodiments of this application. The following describes a content transmission protection apparatus provided in embodiments of this application. FIG. 12 is a schematic diagram of a structure of a content transmission protection apparatus according to an embodiment of this application. As shown in FIG. 12, the apparatus includes:

an authentication module 1201, configured to: in a process of establishing a transmission link between a transmit end and a receive end, perform authentication key exchange with the receive end to obtain an authentication key, where the authentication module 1201 is further configured to perform session key agreement with the receive end based on the authentication key to obtain a session key;

an authorization module 1202, configured to perform authorization control on the receive end after establishment of the transmission link between the transmit end and the receive end is completed; and an encryption module 1203, configured to send an encrypted audio/video stream to the receive end after the transmit end completes authorization control on the receive end, where the encrypted audio/video stream is encrypted based on the session key.

In a possible implementation, the authentication module 1201 is specifically configured to:

send a first message to the receive end, where the first message is used to request authentication;

receive a second message from the receive end, where the second message includes a signature and a hash-based message authentication code hmac for authentication calculated by the receive end, and the signature indicates an identity of the receive end;

calculate the authentication key and calculate an hmac for authentication based on the authentication key calculated by the transmit end;

verify the signature if it is determined that the hmac for authentication calculated by the transmit end is the same as the hmac for authentication calculated by the receive end;

if the signature is successfully verified, calculate an authentication key authentication code based on the authentication key calculated by the transmit end; and send a third message to the receive end, where the third message includes the authentication key authentication code calculated by the transmit end.

In a possible implementation, the first message includes a version number list. The second message further includes a version number of the receive end and an update time of a revocation list of the receive end. The version number of the receive end is in the version number list. The authentication module 1201 is specifically configured to:

calculate the hmac for authentication based on the version number of the receive end, the update time of the revocation list of the receive end, and the authentication key calculated by the transmit end; and calculate the authentication key authentication code based on the version number of the receive end and the authentication key calculated by the transmit end.

In a possible implementation, the authentication module 1201 is further configured to: send a revocation list update message to the receive end when determining that an update time of a revocation list of the transmit end is different from the update time of the revocation list of the receive end. The revocation list update message includes the revocation list of the transmit end.

In a possible implementation, the authorization module 1202 is specifically configured to:

obtain authorization control information corresponding to the audio/video stream; and perform, based on the authorization control information corresponding to the audio/video stream, authorization control on the receive end in a unit of the audio/video stream. The authorization control information includes a security level, a copy limit, a retention time, a maximum cascading depth, and a maximum number of connected devices supported by a device of each level.

In a possible implementation, the authorization module 1202 is further configured to send a tenth message to the receive end. The tenth message includes an identifier of an audio/video stream transmission channel corresponding to the audio/video stream and the authorization control information corresponding to the audio/video stream. The identifier of the audio/video stream transmission channel indicates the audio/video stream transmission channel corresponding to the audio/video stream. The tenth message indicates the receive end to perform, based on the audio/video stream transmission channel corresponding to the audio/video stream and the authorization control information corresponding to the audio/video stream, authorization control on a lower-level device of the receive end in a unit of the audio/video stream.

In a possible implementation, the encryption module 1203 is specifically configured to send encrypted data to the receive end. The encrypted data includes an encryption information header and at least one encrypted audio/video stream. The at least one encrypted audio/video stream is set in a unit of the audio/video stream transmission channel. The encryption information header includes a version of the encryption information header, an encryption method indication value, an encryption algorithm indication value, an encryption mode, a reserved field, and a counter.

In a possible implementation, the first message further includes a current session identifier, a transmit end identifier, a public key list, and a fast authentication identifier, and the fast authentication identifier indicates the receive end to enter a fast authentication process or a common authentication process.

In a possible implementation, the second message further includes the current session identifier, a public key of the receive end, a device certificate authority (CA) certificate of the receive end, and a device certificate of the receive end.

In a possible implementation, the session key includes: an odd key for content encryption and an even key for content encryption. The odd key for content encryption or the even key for content encryption is used to encrypt the audio/video stream.

Figure 13:
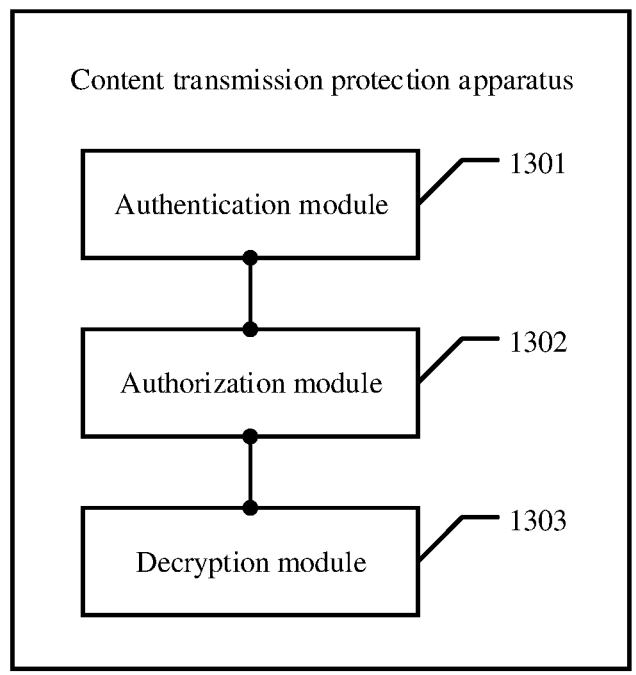
FIG. 13 is an example schematic diagram of another structure of a content transmission protection apparatus according to an embodiment of this application.

FIG. 13 is a schematic diagram of another structure of a content transmission protection apparatus according to an embodiment of this application. As shown in FIG. 13, the apparatus includes:
an authentication module 1301, configured to: in a process of establishing a transmission link between a transmit end and a receive end, perform authentication key exchange with the transmit end to obtain an authentication key, where
the authentication module 1301 is further configured to perform session key agreement with the transmit end based on the authentication key to obtain a session key;
an authorization module 1302, configured to respond to authorization control of the transmit end after establishment of a transmission link between the transmit end and the receive end is completed; and
a decryption module 1303, configured to: receive an encrypted audio/video stream from the transmit end after the transmit end completes authorization control on the receive end, where the encrypted audio/video stream is encrypted based on the session key.

In a possible implementation, the authentication module 1301 is specifically configured to:
receive a first message from the transmit end, where the first message is used to request authentication;
calculate a signature and the authentication key, and calculate an hmac for authentication based on the authentication key calculated by the receive end;
send a second message to the transmit end, where the second message includes the signature and the hmac for authentication calculated by the receive end, and the signature indicates an identity of the receive end;
receive a third message from the transmit end, where the third message includes an authentication key authentication code calculated by the transmit end;
calculate an authentication key authentication code based on the authentication key calculated by the receive end; and if it is determined that the authentication key authentication code calculated by the transmit end is the same as the authentication key authentication code calculated by the receive end, cache the authentication key calculated by the receive end.

In a possible implementation, the first message includes a version number list. The authentication module 1301 is specifically configured to: if it is determined that a version number of the receive end is in the version number list, calculate the signature based on the version number of the receive end and an update time of a revocation list of the receive end.

In a possible implementation, the authentication module 1301 is specifically configured to:
calculate the hmac for authentication based on the version number of the receive end, the update time of the revocation list of the receive end, and the authentication key calculated by the receive end; and
calculate the authentication key authentication code based on the version number of the receive end and the authentication key calculated by the receive end.

In a possible implementation, the authentication module 1301 is further configured to:
receive a revocation list update message from the transmit end, where the revocation list update message includes a revocation list of the transmit end;
replace the revocation list of the receive end with the revocation list of the transmit end; and
verify a certificate of a lower-level device of the receive end by using the revocation list of the transmit end.

In a possible implementation, the authorization module 1302 is specifically configured to respond to authorization control performed by the transmit end in a unit of the audio/video stream based on authorization control information corresponding to the audio/video stream. The authorization control information includes a security level, a copy limit, a retention time, a maximum cascading depth, and a maximum number of connected devices supported by a device of each level.

In a possible implementation, the authorization module 1302 is further configured to:
receive a tenth message from the transmit end, where the tenth message includes an identifier of an audio/video stream transmission channel corresponding to the audio/video stream and the authorization control information corresponding to the audio/video stream, and the identifier of the audio/video stream transmission channel indicates the audio/video stream transmission channel corresponding to the audio/video stream; and
perform, based on the audio/video stream transmission channel corresponding to the audio/video stream and the authorization control information corresponding to the audio/video stream, authorization control on the lower-level device of the receive end in a unit of the audio/video stream.

In a possible implementation, the decryption module 1303 is specifically configured to receive encrypted data from the transmit end. The encrypted data includes an encryption information header and at least one encrypted audio/video stream. The at least one encrypted audio/video stream is set in a unit of the audio/video stream transmission channel. The encryption information header includes a version of the encryption information header, an encryption method indication value, an encryption algorithm indication value, an encryption mode, a reserved field, and a counter.

In a possible implementation, the first message further includes a current session identifier, a transmit end identifier, a public key list, and a fast authentication identifier, and the fast authentication identifier indicates the receive end to enter a fast authentication process or a common authentication process.

In a possible implementation, the second message further includes the current session identifier, a public key of the receive end, a device certificate authority (CA) certificate of the receive end, and a device certificate of the receive end.

In a possible implementation, the session key includes: an odd key for content encryption and an even key for content encryption. The odd key for content encryption or the even key for content encryption is used to encrypt the audio/video stream.

It should be noted that content such as information exchange between the modules/units of the apparatus and the execution processes thereof is based on the same idea as the method embodiments of this application, and produces the same technical effects as the method embodiments of this application. For specific content, refer to the foregoing descriptions in the method embodiments of this application.

An embodiment of this application further relates to a computer-readable storage medium, including instructions. When the instructions are run on a computer, the computer is enabled to perform the methods shown in FIG. 6A, FIG. 6B, FIG. 7, FIG. 8, FIG. 9, and FIG. 11.

An embodiment of this application further relates to a computer program product including instructions. When the computer program product runs on a computer, the computer is enabled to perform the methods shown in FIG. 6A, FIG. 6B, FIG. 7, FIG. 8, FIG. 9, and FIG. 11.

It may be clearly understood by a person skilled in the art that, for ease and brevity of description, for a detailed working process of foregoing system, apparatus, and unit, refer to a corresponding process in the foregoing method embodiments.

In the several embodiments provided in this application, it should be understood that the disclosed system, apparatus, and method may be implemented in another manner. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A content transmission protection method, comprising:
   in a process of establishing a transmission link between a transmit end and a receive end, obtaining, by the transmit end, an authentication key by performing authentication key exchange with the receive end;
   obtaining, by the transmit end, a session key by performing session key agreement with the receive end based on the authentication key;
   performing, by the transmit end, authorization control on the receive end after establishing the transmission link between the transmit end and the receive end; and
   sending, by the transmit end, an encrypted audio/video stream to the receive end after the transmit end completes authorization control on the receive end, wherein the audio/video stream is encrypted based on the session key, wherein obtaining, by the transmit end, the authentication key comprise:
   sending, by the transmit end, a first message to the receive end, wherein the first message is used to request authentication;
   receiving, by the transmit end, a second message from the receive end, wherein the second message comprises a signature and a hash-based message authentication code (hmac) for authentication calculated by the receive end, and the signature indicates an identity of the receive end;
   calculating by the transmit end, the authentication key, calculating on hmac for authentication based on the authentication key calculated by the transmit end;
   verifying the signature in association with the transmit end determining that the hmac for authentication calculated by the transmit end is the same as the hmac for authentication calculated by the receive end,
   in association with the transmit end successfully verifying the signature, calculating an authentication key authentication code based on the authentication key calculated by the transmit end; and
   sending, by the transmit end, a third message to the receive end, wherein the third message includes the authentication key authentication code calculated by the transmit end.

2. The method according to claim 1, wherein the first message comprises a version number list, the second message further comprises a version number of the receive end and an update time of a revocation list of the receive end, the version number of the receive end is included in the version number list, and calculating the hmac for authentication based on the authentication key calculated by the transmit end comprises:
   calculating the hmac for authentication based on: the version number of the receive end, the update time of the revocation list of the receive end, and the authentication key calculated by the transmit end; and calculating the authentication key authentication code based on the authentication key calculated by the transmit end comprises:
    calculating the authentication key authentication code based on the version number of the receive end and the authentication key calculated by the transmit end.

3. The method according to claim 2, wherein after a successful authentication key exchange between the transmit end and the receive end, the method further comprises:
    sending, by the transmit end, a revocation list update message to the receive end in association with determining that an update time of a revocation list of the transmit end is different from the update time of the revocation list of the receive end, wherein the revocation list update message includes the revocation list of the transmit end.

4. The method according to claim 1, wherein
    the first message further includes a current session identifier, a transmit end identifier, a public key list, and a fast authentication identifier, and
    the fast authentication identifier indicates the receive end to enter a fast authentication process or a common authentication process.

5. The method according to claim 1, wherein the second message further includes a current session identifier, a public key of the receive end, a device certificate authority (CA) certificate of the receive end, and a device certificate of the receive end.

6. The method according to claim 1, wherein the session key includes an odd key for content encryption and an even key for content encryption, wherein the odd key for content encryption or the even key for content encryption is used to encrypt the audio/video stream.

7. The method according to claim 1, wherein performing, by the transmit end, the authorization control on the receive end comprises:
    obtaining, by the transmit end, authorization control information corresponding to the audio/video stream; and
    performing, by the transmit end based on the authorization control information corresponding to the audio/video stream, authorization control on the receive end in a unit of the audio/video stream, wherein the authorization control information comprises a security level, a copy limit, a retention time, a maximum cascading depth, and a maximum number of connected devices supported by a device of each level.

8. The method according to claim 7, wherein after the performing, by the transmit end, the authorization control of the audio/video stream on the receive end, the method further comprises:
    sending, by the transmit end, a fourth message to the receive end, wherein
    the fourth message includes an identifier of an audio/video stream transmission channel corresponding to the audio/video stream and the authorization control information corresponding to the audio/video stream,
    the identifier of the audio/video stream transmission channel indicates the audio/video stream transmission channel corresponding to the audio/video stream, and
    the fourth message indicates the receive end to perform, based on the audio/video stream transmission channel corresponding to the audio/video stream and the authorization control information corresponding to the audio/video stream, authorization control on a lower-level device of the receive end in the unit of the audio/video stream.

9. The method according to claim 8, wherein sending, by the transmit end, the encrypted audio/video stream to the receive end comprises:
    sending, by the transmit end, encrypted data to the receive end, wherein
    the encrypted data includes an encryption information header and at least one encrypted audio/video stream,
    the at least one encrypted audio/video stream is set in a unit of the audio/video stream transmission channel, and
    the encryption information header includes a version of the encryption information header, an encryption method indication value, an encryption algorithm indication value, an encryption mode, a reserved field, and a counter.

10. A content transmission protection method, comprising:
    in a process of establishing a transmission link between a transmit end and a receive end, obtaining, by the receive end, an authentication key by performing authentication key exchange with the transmit end;
    obtaining, by the receive end, a session key by performing session key agreement with the transmit end based on the authentication key;
    responding, by the receive end, to authorization control of the transmit end after establishing the transmission link between the transmit end and the receive end; and
    after the transmit end completes authorization control on the receive end, receiving, by the receive end, an encrypted audio/video stream from the transmit end, wherein the audio/video stream is encrypted based on the session key, wherein obtaining the authentication key comprises:
    calculating, by the receive end, a signature and the authentication key;
    calculating on hash-based message authentication code (hmac) for authentication based on the authentication key calculated by the receive end;
    sending, by the receive end, a second message to the transmit end, wherein the second message includes the signature and the hmac for authentication calculated by the receive end, and the signature indicates an identity of the receive end;
    receiving, by the receive end, a third message from the transmit end, wherein the third message includes an authentication key authentication code calculated by the transmit end;
    calculating, by the receive end, an authentication key authentication code based on the authentication key calculated by the receive end; and
    in association with the receive end determining that the authentication key authentication code calculated by the transmit end is the same as the authentication key authentication code calculated by the receive end, caching the authentication key calculated by the receive end.

11. The method according to claim 10, wherein the first message includes a version number list, and calculating, by the receive end, the signature comprises:
    in association with the receive end determining that a version number of the receive end is included in the version number list, calculating the signature based on the version number of the receive end and an update time of a revocation list of the receive end.

12. The method according to claim 11, wherein calculating the hmac for authentication based on the authentication key calculated by the receive end comprises:
calculating the hmac for authentication based on: the version number of the receive end, the update time of the revocation list of the receive end, and the authentication key calculated by the receive end; and
calculating the authentication key authentication code based on the authentication key calculated by the receive end comprises:
calculating the authentication key authentication code based on the version number of the receive end and the authentication key calculated by the receive end.

13. The method according to claim 11, wherein after successful authentication key exchange between the transmit end and the receive end, the method further comprises:
receiving, by the receive end, a revocation list update message from the transmit end, wherein the revocation list update message includes a revocation list of the transmit end;
replacing, by the receive end, the revocation list of the receive end with the revocation list of the transmit end; and
verifying, by the receive end, a certificate of a lower-level device of the receive end by using the revocation list of the transmit end.

14. A system, comprising:
a processor; and
a memory configured to store computer readable instructions that, when executed by the processor, cause the system to:
obtain an authentication key by performing authentication key exchange with a receive end;
obtain a session key by performing session key agreement with the receive end;
perform authorization control on the receive end; and
send an encrypted audio/video stream to the receive end after the completing the authorization control on the receive end, wherein the system is further caused to:
send a first message to the receive end, wherein the first message is used to request authentication;
receive a second message from the receive end, wherein the second message comprises a signature and a hash-based message authentication code (hmac) for authentication calculated by the receive end, and the signature indicates identity of the receive end;
calculate the authentication key;
calculate an hmac for authentication based on the calculated authentication key;
verify the signature in association with determining that the hmac for authentication is the same as the hmac for authentication calculated by the receive end;
in association with successfully verifying the signature, calculate an authentication key authentication code based on the calculated authentication key; and
send a third message to the receive end, wherein the third message includes the calculated authentication key authentication code.

15. The system according to claim 14, wherein the first message comprises a version number list, the second message further comprises a version number of the receive end and an update time of a revocation list of the receive end, the version number of the receive end is included in the version number list, and the system is further caused to:
calculate the hmac for authentication based on: the version number of the receive end, the update time of the revocation list of the receive end, and the calculated authentication key; and
calculate the authentication key authentication code based on the version number of the receive end and the calculated authentication key.

16. The system according to claim 15, wherein after a successful authentication key exchange, the system is further caused to:
send a revocation list update message to the receive end in association with determining that an update time of a revocation list of the system is different from the update time of the revocation list of the receive end, wherein the revocation list update message includes the revocation list of the system.

17. The system according to claim 14, wherein
the first message further includes a current session identifier, a transmit end identifier, a public key list, and a fast authentication identifier,
the fast authentication identifier indicates the receive end to enter a fast authentication process or a common authentication process, and
the second message further includes the current session identifier, a public key of the receive end, a device certificate authority (CA) certificate of the receive end, and a device certificate of the receive end.

18. The system according to claim 14, wherein the session key includes an odd key for content encryption and an even key for content encryption, wherein the odd key for content encryption or the even key for content encryption is used to encrypt the audio/video stream.

19. The system according to claim 14, wherein the system is further caused to:
obtain authorization control information corresponding to the audio/video stream; and
perform, based on the authorization control information corresponding to the audio/video stream, authorization control on the receive end in a unit of the audio/video stream, wherein the authorization control information comprises a security level, a copy limit, a retention time, a maximum cascading depth, and a maximum number of connected devices supported by a device of each level.

20. The system according to claim 19, wherein after performing the authorization control of the audio/video stream on the receive end, the system is further caused to:
send a fourth message to the receive end, wherein
the fourth message includes an identifier of an audio/video stream transmission channel corresponding to the audio/video stream and the authorization control information corresponding to the audio/video stream,
the identifier of the audio/video stream transmission channel indicates the audio/video stream transmission channel corresponding to the audio/video stream, and
the fourth message indicates the receive end to perform, based on the audio/video stream transmission channel corresponding to the audio/video stream and the authorization control information corresponding to the audio/video stream, authorization control on a lower-level device of the receive end in the unit of the audio/video stream.

* * * * *